US012586858B2

(12) United States Patent
Tang et al.

(10) Patent No.: US 12,586,858 B2
(45) Date of Patent: Mar. 24, 2026

(54) BATTERY, ELECTRIC DEVICE, METHOD FOR MANUFACTURING BATTERY, AND DEVICE FOR MANUFACTURING BATTERY

(71) Applicant: CONTEMPORARY AMPEREX TECHNOLOGY (HONG KONG) LIMITED, Hong Kong (CN)

(72) Inventors: Yu Tang, Ningde (CN); Peng Wang, Ningde (CN); Xiayi Wu, Ningde (CN); Zhenhua Li, Ningde (CN); Xing Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 705 days.

(21) Appl. No.: 17/967,845

(22) Filed: Oct. 17, 2022

(65) Prior Publication Data

US 2023/0207947 A1      Jun. 29, 2023

Related U.S. Application Data

(63) Continuation of application No. PCT/CN2021/142273, filed on Dec. 29, 2021.

(51) Int. Cl.
H01M 50/264 (2021.01)
H01M 10/04 (2006.01)
(Continued)

(52) U.S. Cl.
CPC ..... H01M 50/264 (2021.01); H01M 10/0431 (2013.01); H01M 50/147 (2021.01);
(Continued)

(58) Field of Classification Search
CPC ............. H01M 50/264; H01M 50/209; H01M 50/147; H01M 50/271; H01M 10/0431; H01M 2220/20
See application file for complete search history.

(56) References Cited

U.S. PATENT DOCUMENTS

2020/0099027 A1* 3/2020 Ishibashi ............... H01M 10/46
2020/0212386 A1* 7/2020 Jin .................... H01M 10/0463
(Continued)

FOREIGN PATENT DOCUMENTS

CN        209344217 U      9/2019
CN        111106279 A      5/2020
(Continued)

OTHER PUBLICATIONS

CN-112310575 MT (Year: 2021).*
(Continued)

*Primary Examiner* — Alexander Usyatinsky
(74) *Attorney, Agent, or Firm* — ANOVA LAW GROUP, PLLC

(57) ABSTRACT

Provided are battery, electric device, method for manufacturing battery, and device for manufacturing battery. The battery includes: multiple battery cells, wherein a wall with the largest area among outer walls of each battery cell is provided parallel to horizontal plane; and a binding component, accommodating and binding the multiple battery cells, wherein a reinforcing portion is provided at part of the binding component parallel to the wall with the largest area, and the reinforcing portion reinforces the strength of the binding component, to enhance binding force of the binding component to the multiple battery cells. The binding force to the walls with the largest area among outer walls of the battery cells is enhanced, too much expansion and deformation of the battery cells is avoided, and the failure probability of the battery caused by extrusion to other structural parts of the battery after the battery cells expand is reduced.

13 Claims, 14 Drawing Sheets

(51) Int. Cl.
    *H01M 50/147*     (2021.01)
    *H01M 50/209*     (2021.01)
    *H01M 50/271*     (2021.01)

(52) U.S. Cl.
    CPC ....... *H01M 50/209* (2021.01); *H01M 50/271*
    (2021.01); *H01M 2220/20* (2013.01)

(56) References Cited

U.S. PATENT DOCUMENTS

| | | | |
|---|---|---|---|
| 2020/0212388 A1* | 7/2020 | Chen | H01M 50/264 |
| 2021/0036278 A1 | 2/2021 | Tang et al. | |
| 2021/0111458 A1 | 4/2021 | Chen et al. | |
| 2022/0263201 A1 | 8/2022 | Wang et al. | |

FOREIGN PATENT DOCUMENTS

| | | | | |
|---|---|---|---|---|
| CN | 112310575 A | * | 2/2021 | ......... H01M 50/581 |
| CN | 212725451 U | | 3/2021 | |
| CN | 214589152 U | | 11/2021 | |
| JP | 2009187781 A | | 8/2009 | |
| JP | 2014072055 A | | 4/2014 | |
| JP | 2015011919 A | | 1/2015 | |
| KR | 20140074151 A | * | 6/2014 | ......... H01M 50/308 |
| KR | 20230165881 A | | 12/2023 | |
| WO | 2020259434 A1 | | 12/2020 | |
| WO | 2021098466 A1 | | 5/2021 | |
| WO | 2021196796 A1 | | 10/2021 | |

OTHER PUBLICATIONS

KR-20140074151—(Year: 2014).*

The decision of EPO to grant a Patent for Application EP.21936238 (Year: 2025).*

The decision of JPO to grant a Patent for Application JP.2022551538 (Year: 2025).*

The European Patent Office (EPO) The Extended European Search Report for Application No. 21936238.1 Jul. 25, 2024 6 Pages.

The Japan Patent Office (JPO) Notice of Reasons for Refusal for Application No. 2022-551538 Sep. 24, 2024 8 Pages (including translation).

Korean Intellectual Property Office (KIPO) Office Action 1 for Application No. 10-2022-7029217 Aug. 26, 2024 22 Pages (including translation).

The World Intellectual Property Organization (WIPO) International Search Report and written opinion for PCT/CN2021/142273 Sep. 29, 2022 9 pages (including English translation).

The Japan Patent Office (JPO) Notification of Reasons for Refusal for Application No. 2022-551538 and Translation Feb. 27, 2024 6 Pages.

The Korean Intellectual Property Office Patent Decision for Application No.10-2022-7029217 Apr. 8, 2025 6 Pages (including translation).

* cited by examiner (a)

(b)

(a)

(b)

(c)

BATTERY, ELECTRIC DEVICE, METHOD FOR MANUFACTURING BATTERY, AND DEVICE FOR MANUFACTURING BATTERY

CROSS-REFERENCE TO RELATED APPLICATIONS

This application is a continuation application of PCT Patent Application No. PCT/CN2021/142273, entitled "BATTERY, ELECTRIC DEVICE, METHOD FOR MANUFACTURING BATTERY, AND DEVICE FOR MANUFACTURING BATTERY" filed on Dec. 29, 2021, which IS incorporated herein by reference in ITS entirety.

TECHNICAL FIELD

Embodiments of the present disclosure relate to the technical field of batteries, and in particular to a battery, an electric device, and a method for manufacturing a battery, and a device for manufacturing a battery.

BACKGROUND ART

Due to the advantages of high energy density, high power density, long lifetime, environmental friendliness and the like, the lithium-ion batteries are widely applied to electronic equipment such as computers and mobile phones and power battery systems of new energy automobiles in recent years.

The process of using the battery is just a process of multiple charge and discharge cycles of the battery cell. In the process of charge and discharge cycle of the battery cell, positive and negative electrode sheets in an electrode assembly of the battery cell may cause periodic expansion of the battery cell due to structural change of an active material or occurrence of side reaction. As the battery life cycle is prolonged, an expansion force generated during the periodic expansion tends to increase gradually. Too much expansion and deformation of the battery cell may cause failure of the battery due to too large stress, and the performance of the battery cell in the cycle process is affected. Therefore, how to bind the battery cell is a technical problem to be solved.

SUMMARY

In view of the above problems, embodiments of the present disclosure provide a battery, an electric device, a method for manufacturing a battery, and a device for manufacturing a battery, which can enhance a binding force to battery cells, prevent too much expansion and deformation of the battery cells, and reduce the failure probability of the battery caused by extrusion to other structural parts of the battery after the battery cells expand.

According to a first aspect of the embodiments of the present disclosure, a battery is provided, including: a plurality of battery cells, wherein a wall with the largest area among outer walls of each of the battery cells is provided parallel to a horizontal plane; and a binding component, configured to accommodate and bind the plurality of battery cells, wherein a reinforcing portion is provided at a part of the binding component parallel to the wall with the largest area, and the reinforcing portion is configured to reinforce the strength of the binding component so as to enhance a binding force of the binding component to the walls with the largest area among the outer walls of the plurality of batter cells.

In an embodiment of the present disclosure, the battery cells in the battery are placed horizontally in a case, that is, walls with the largest area among outer walls of the battery cells in the battery are provided parallel to the horizontal plane. The battery cells in the battery are accommodated and bound with the binding component, the reinforcing portion is provided at the part of the binding component parallel to the walls with the largest area, and the strength of the binding component is reinforced by the reinforcing portion, so as to enhance the binding force of the binding component to the walls with the largest area among outer walls of the plurality of battery cells, avoid too much deformation of the battery cells caused by the walls with the largest area among the outer walls of the battery cells, reduce the failure probability of the battery caused by extrusion to other structural parts of the battery after the battery cells expand, and guarantee the performance of the battery during the cycle. Moreover, there is no need to thicken the binding component as a whole, ensuring the energy density of the battery as far as possible In some embodiments, the reinforcing portion is provided correspondingly to a region between two adjacent battery cells and/or a region between the battery cells and the binding component.

By providing the reinforcing portion corresponding to the region between two adjacent battery cells and/or the region between the battery cells and the binding component, compared with the manner of providing the reinforcing portion in other regions, the structural strength of the binding component at the position of the reinforcing portion is enhanced, peripheries of the walls with the largest area among the outer walls of the battery cells can be locked, the binding force to the battery cells can be increased, the amount of expansion and deformation of the battery cells under the same expansion force is reduced, and further the failure of the battery is avoided and the performance of the battery is ensured. Moreover, the above regions are regions with minimum expansion at edges of the battery cells, and providing the reinforcing portion at the positions corresponding to the above regions will not occupy an expansion space of the walls with the largest area among the outer walls of the battery cells, and will not affect an expansion gap of the battery cells, further ensuring the performance of the battery.

In some embodiments, the binding component includes: an upper cover, wherein at least a part of the upper cover is provided at the top of the plurality of battery cells; and a lower case, wherein at least a part of the lower case is provided at the bottom of the plurality of battery cells; the reinforcing portion is provided at the part of the upper cover provided at the top of the plurality of battery cells, and/or the part of the lower case provided at the bottom of the plurality of battery cells.

By providing the binding component as the upper cover and the lower case, providing at least a part of the upper cover on the top of the plurality of battery cells, providing at least a part of the lower case on the bottom of the plurality of battery cells, and providing the reinforcing portion on the part of the upper cover provided on the top of the plurality of battery cells, and/or the part of the lower case provided on the bottom of the plurality of battery cells, it is easy to assemble the binding component, and the reinforcing portion can be flexibly provided according to actual requirements.

In some embodiments, the reinforcing portion is integrally molded with the binding component.

When the reinforcing portion and the binding component are integrally molded, the degree of bonding therebetween can be improved, and the reinforcing effect of the reinforcing portion on the strength of the binding component is enhanced.

In some embodiments, the binding component protrudes in a direction away from the battery cells to form the reinforcing portion, and a recess is formed on a surface of the binding component close to the battery cells in a region opposite to the reinforcing portion.

By making the binding component protrude in a direction away from the battery cells to form the reinforcing portion, the processing is facilitated and the cost is relatively low.

In some embodiments, the upper cover and the lower case are both provided with the reinforcing portion, and the reinforcing portion on the upper cover and the reinforcing portion on the lower case are corresponding in position in a vertical direction; and a region between the reinforcing portion on the upper cover and the reinforcing portion on the lower case is filled with an adhesive, so as to connect the reinforcing portion on the upper cover and the reinforcing portion on the lower case.

By providing the positions of the reinforcing portion on the upper cover and the reinforcing portion on the lower case to be corresponding in the vertical direction, and filling the adhesive in the region between the reinforcing portion on the upper cover and the reinforcing portion on the lower case, the reinforcing portion on the upper cover and the reinforcing portion on the lower case are connected by the adhesive, thus further improving the strength of the whole binding component.

In some embodiments, the battery cell includes an end cover and a housing, the end cover is placed perpendicular to the horizontal plane, an R angle is provided at a bottom of the housing away from the end cover, and the R angle is covered with the adhesive.

By covering the R angle with the adhesive, the adhesive between two adjacent columns of battery cell groups or between two adjacent rows of battery cell groups forms a glue nail structure, further enhancing the structural strength of the binding component and enhancing the binding strength of the binding component to the battery cells.

In some embodiments, the reinforcing portion includes a first reinforcing portion, and the first reinforcing portion covers a region between two adjacent battery cells in the vertical direction.

As the first reinforcing portion covers the region between two adjacent battery cells in the vertical direction, and this region is a position bonding the battery cells and the upper cover and the lower case, by providing the first reinforcing portion at this position and covering the region between two adjacent battery cells, degumming can be reduced, and the overall structural strength of the battery can be improved.

In some embodiments, the battery cell includes an end cover and a housing, the end cover is placed perpendicular to the horizontal plane, an R angle is provided at a bottom of the housing away from the end cover, and the first reinforcing portion covers adjacent R angles of two adjacent battery cells in the vertical direction.

As the first reinforcing portion covers the adjacent R angles of two adjacent battery cells in the vertical direction, and this region is a position bonding the battery cells and the upper cover and the lower case, by providing the first reinforcing portion at this position, degumming can be reduced, and the overall structural strength of the battery can be improved.

In some embodiments, the housing includes a first wall, and the first wall is perpendicular to the horizontal plane; and a horizontal distance between an edge of the first reinforcing portion and the first wall is less than or equal to 5 mm.

The horizontal distance between the edge of the first reinforcing portion and the first wall is less than or equal to 5 mm, so that the first reinforcing portion possibly does not cover the first side walls of the battery cell too much, thus ensuring an expansion space for the wall with the largest area among the side walls of the battery cell, and further ensuring the performance of the battery.

In some embodiments, the battery cell includes an electrode assembly, and the electrode assembly includes a first electrode sheet and a second electrode sheet; the first electrode sheet and the second electrode sheet are wound around a winding axis and form a winding structure, and the winding axis is parallel to the horizontal plane; alternatively, the electrode assembly includes a plurality of first electrode sheets and a plurality of second electrode sheets, and the plurality of first electrode sheets and the plurality of second electrode sheets are alternately stacked in the vertical direction; alternatively, the electrode assembly includes a plurality of second electrode sheets, the first electrode sheet includes a plurality of stacked segments that are provided in a stacked manner and a plurality of bent segments, each of the bent segments is connected to two adjacent stacked segments, and the plurality of stacked segments and the plurality of second electrode sheets are alternately stacked in the vertical direction.

For the battery cells obtained in the above manner, a main expansion direction of the battery cells is the vertical direction.

In some embodiments, the battery further includes an upper case, and the upper case and the lower case are snap-fitted and sealed.

By providing the upper case and snap-fitting and sealing the upper case and the lower case, the battery cells can be protected while the battery cells are accommodated.

In some embodiments, the lower case is further provided with a fixed beam, and the upper cover is fixed to the fixed beam, so that the plurality of battery cells are bound between the upper cover and the lower case.

By providing the fixed beam, the upper cover is fixed to the fixed beam, so that the upper cover can be fixed, and the strength of the binding component also can be enhanced, improving the binding force of the binding component to the battery cells.

According to a second aspect of the embodiments of the present disclosure, an electric device is provided, including the battery according to the above embodiments, wherein the battery is used to provide electrical energy.

According to a third aspect of the embodiments of the present disclosure, a method for manufacturing a battery is provided, including: providing a plurality of battery cells, wherein a wall with the largest area among outer walls of each of the battery cells is provided parallel to a horizontal plane; providing a binding component, wherein a reinforcing portion is provided at a part of the binding component parallel to the wall with the largest area, and the reinforcing portion is configured to enhance strength of the binding component so as to enhance a binding force of the binding component to the walls with the largest area among outer walls of the plurality of battery cells; and accommodating the plurality of battery cells in the binding component, and making the binding component bind the plurality of battery cells.

5

According to a fourth aspect of the embodiments of the present disclosure, a device for manufacturing a battery is provided, including: a first providing apparatus, configured to provide a plurality of battery cells, wherein a wall with the largest area among outer walls of each of the battery cells is provided parallel to a horizontal plane; a second providing apparatus, configured to provide a binding component, wherein a reinforcing portion is provided at a part of the binding component parallel to the wall with the largest area, and the reinforcing portion is configured to enhance strength of the binding component so as to enhance a binding force of the binding component to the walls with the largest area among outer walls of the plurality of battery cells; and an assembling apparatus, configured to accommodate the plurality of battery cells in the binding component, and make the binding component bind the plurality of battery cells.

The above description is merely a summary of the technical solutions of the present disclosure, implementation can be carried out according to the contents of the specification in order to be capable of understanding the technical means of the present disclosure, and for making the above and other objectives, features, and advantages of the present disclosure more apparent and understandable, specific embodiments of the present disclosure are specifically given below.

BRIEF DESCRIPTION OF DRAWINGS

Features, advantages, and technical effects of the exemplary embodiments of the present disclosure will be described below with reference to the accompanying drawings.

Figure 5:
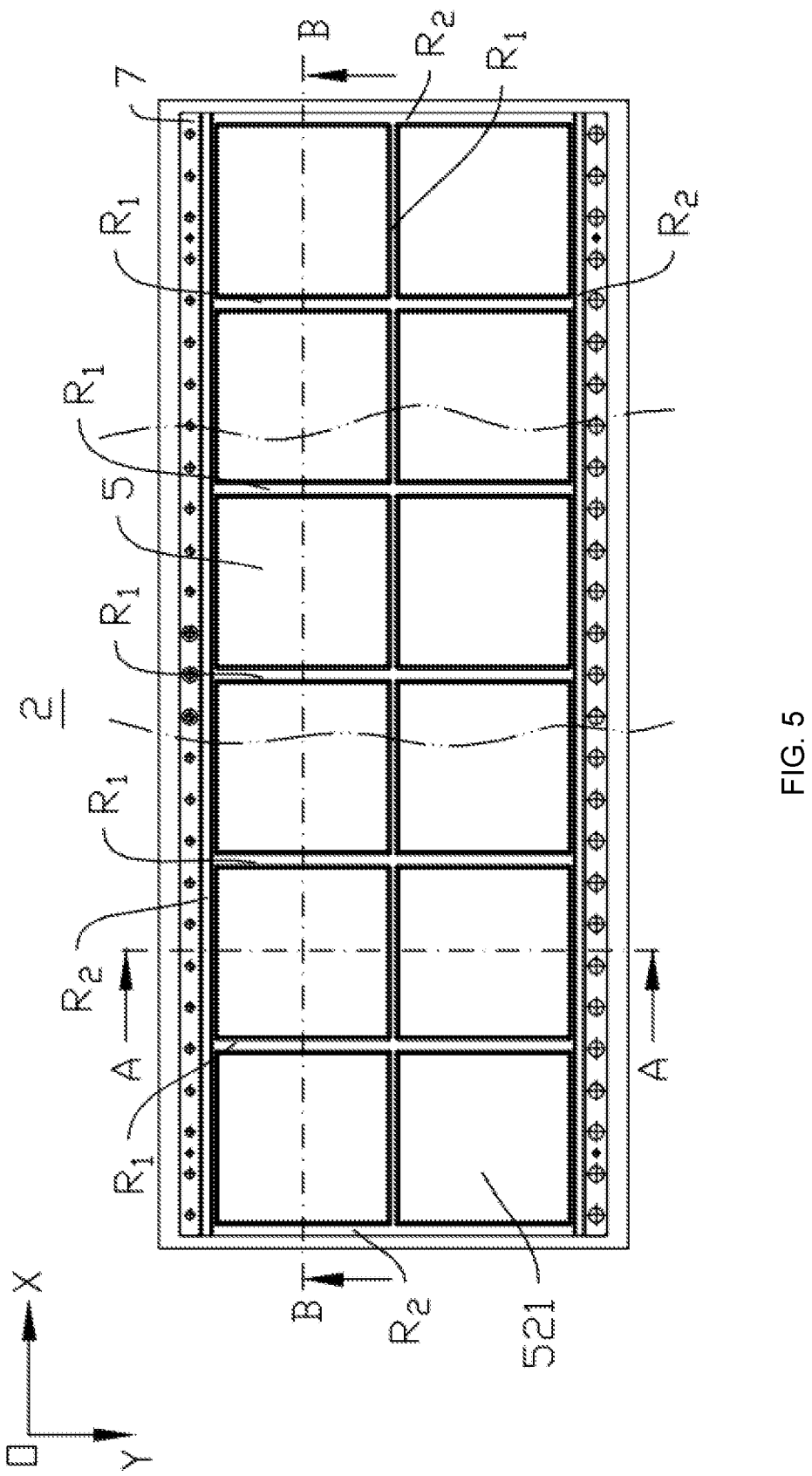
FIG. 5 is a top structural view of the battery provided in some embodiments of the present disclosure.
Figure 7:
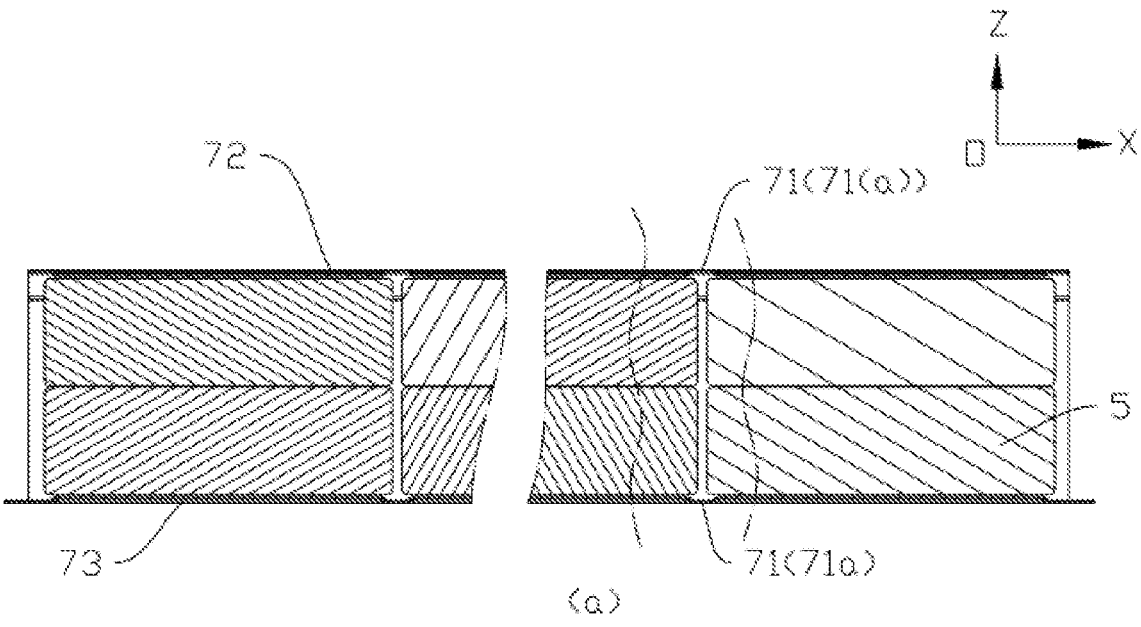
Figure 7:
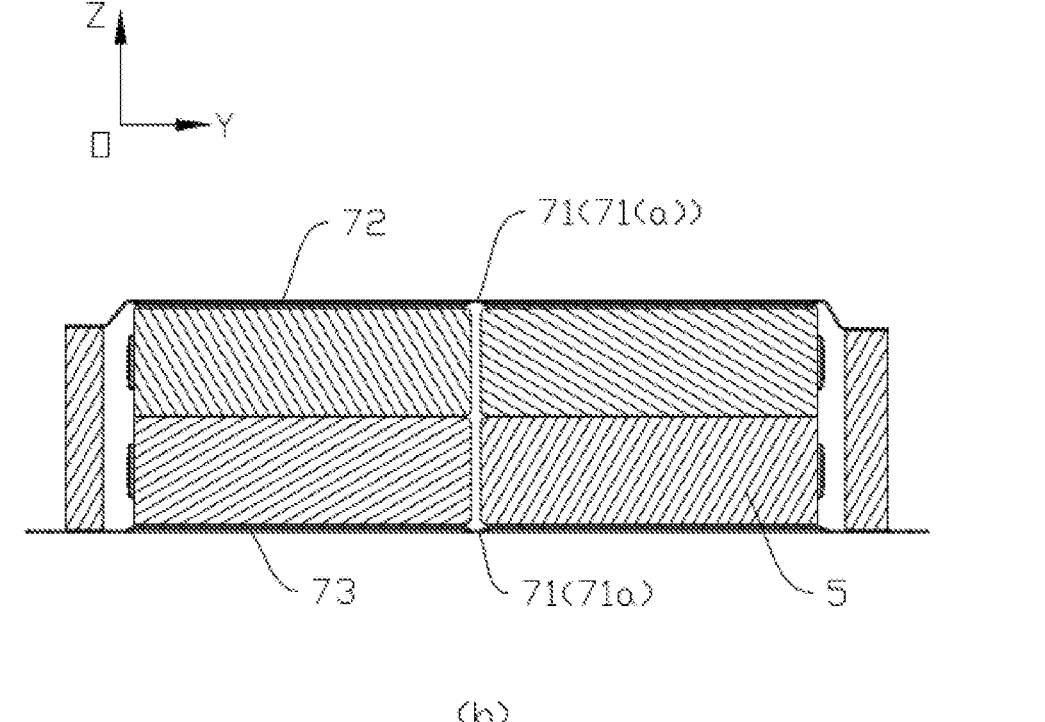
Figure 8:
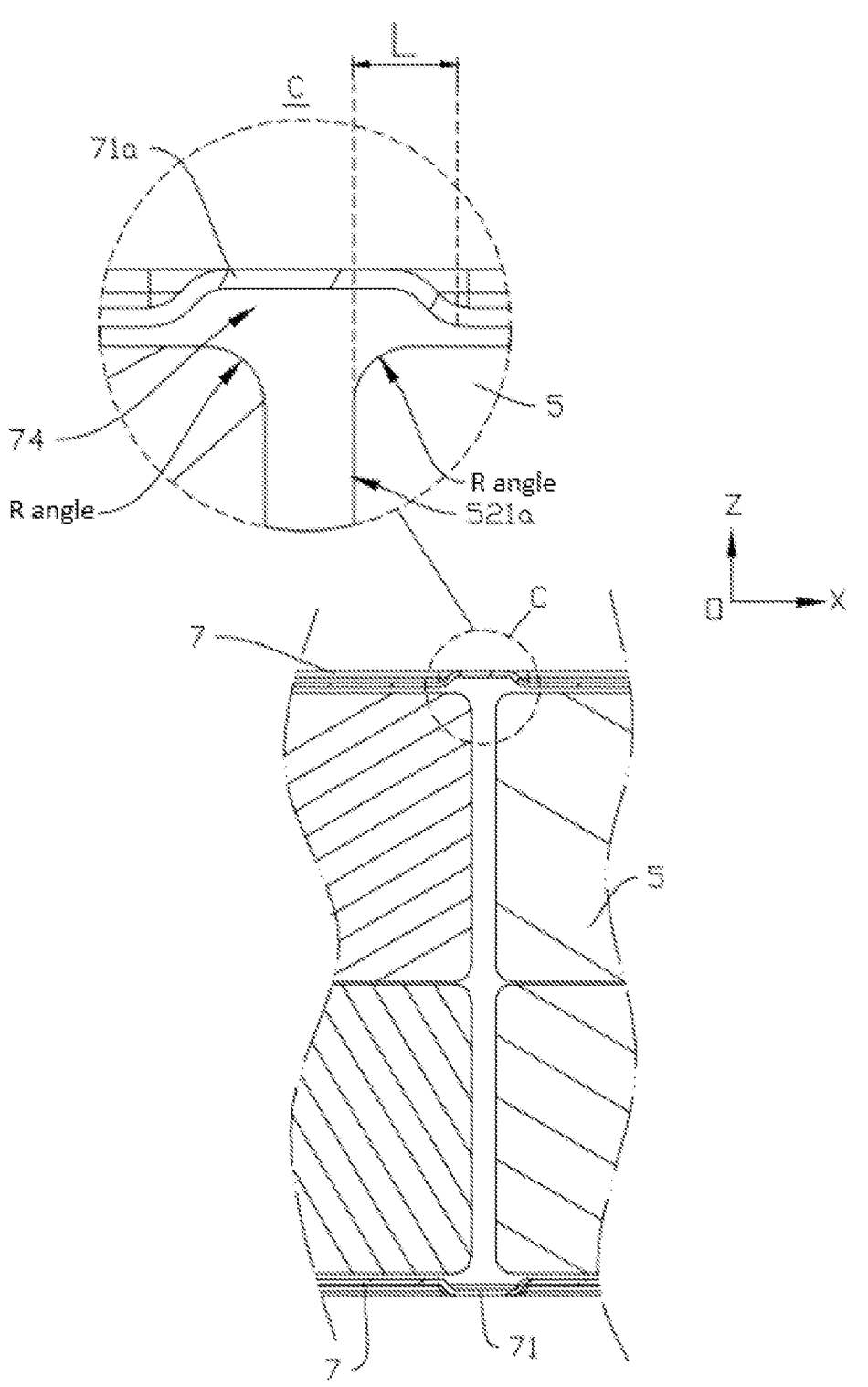
Figure 9:
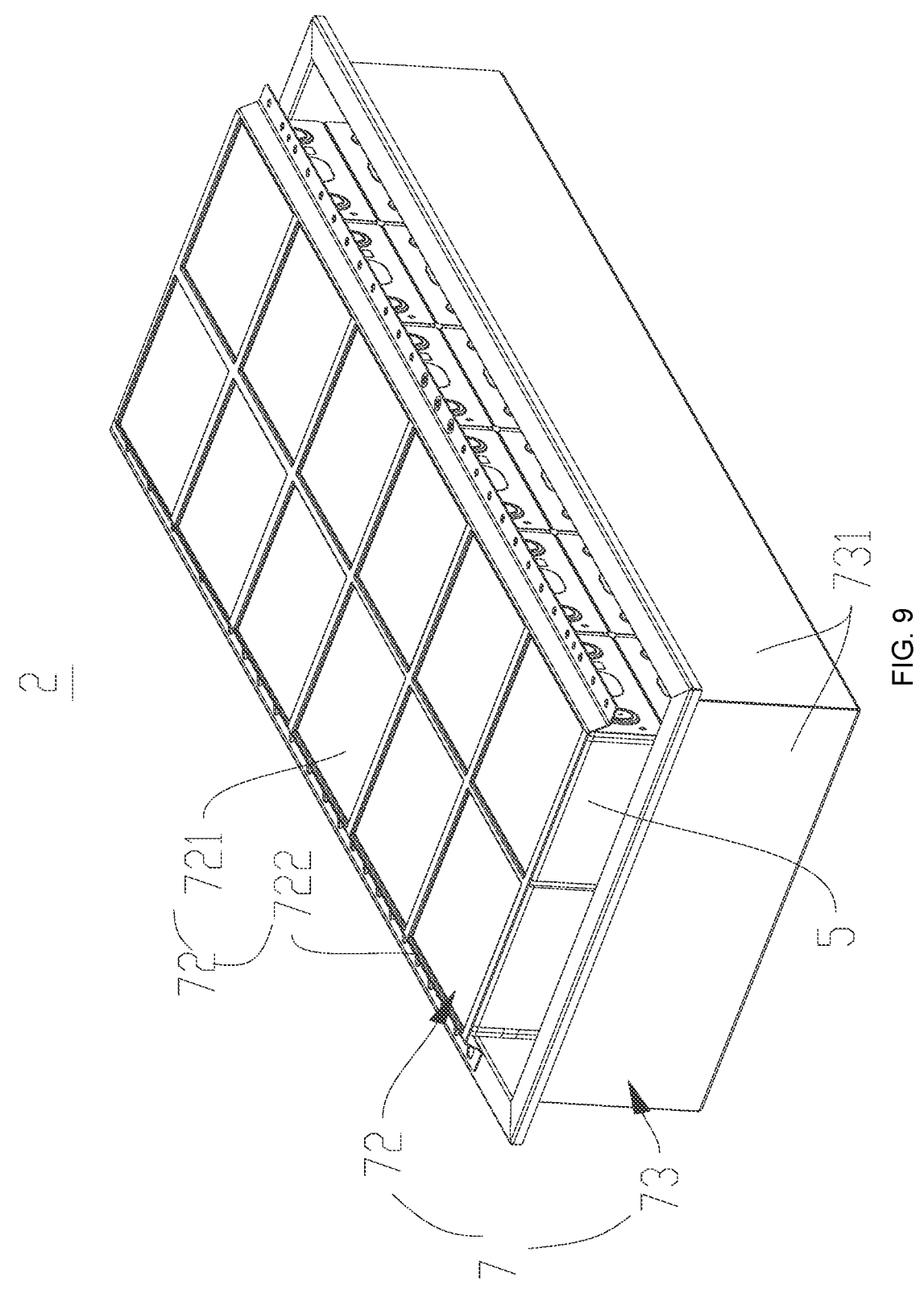
Figure 10:
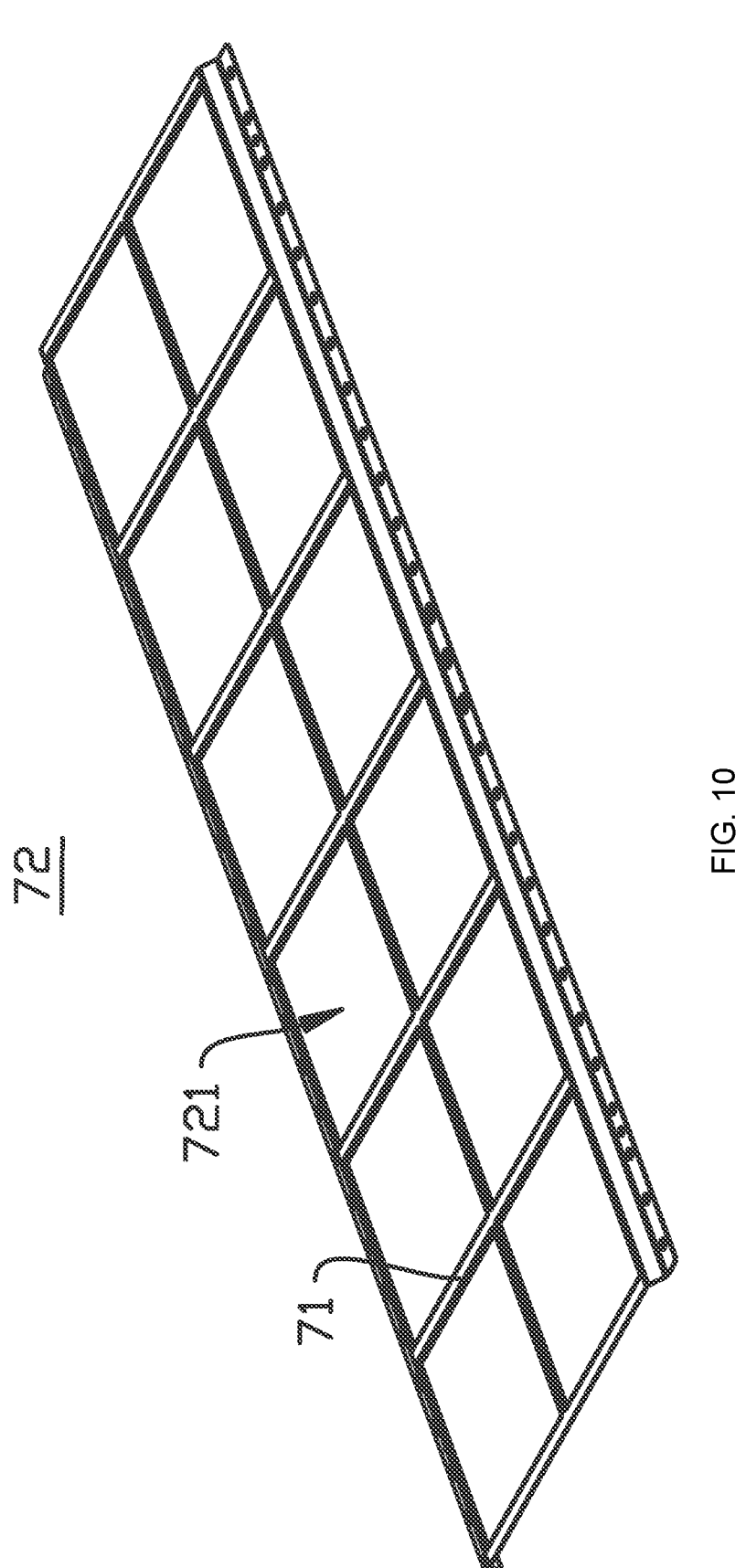
Figure 11:
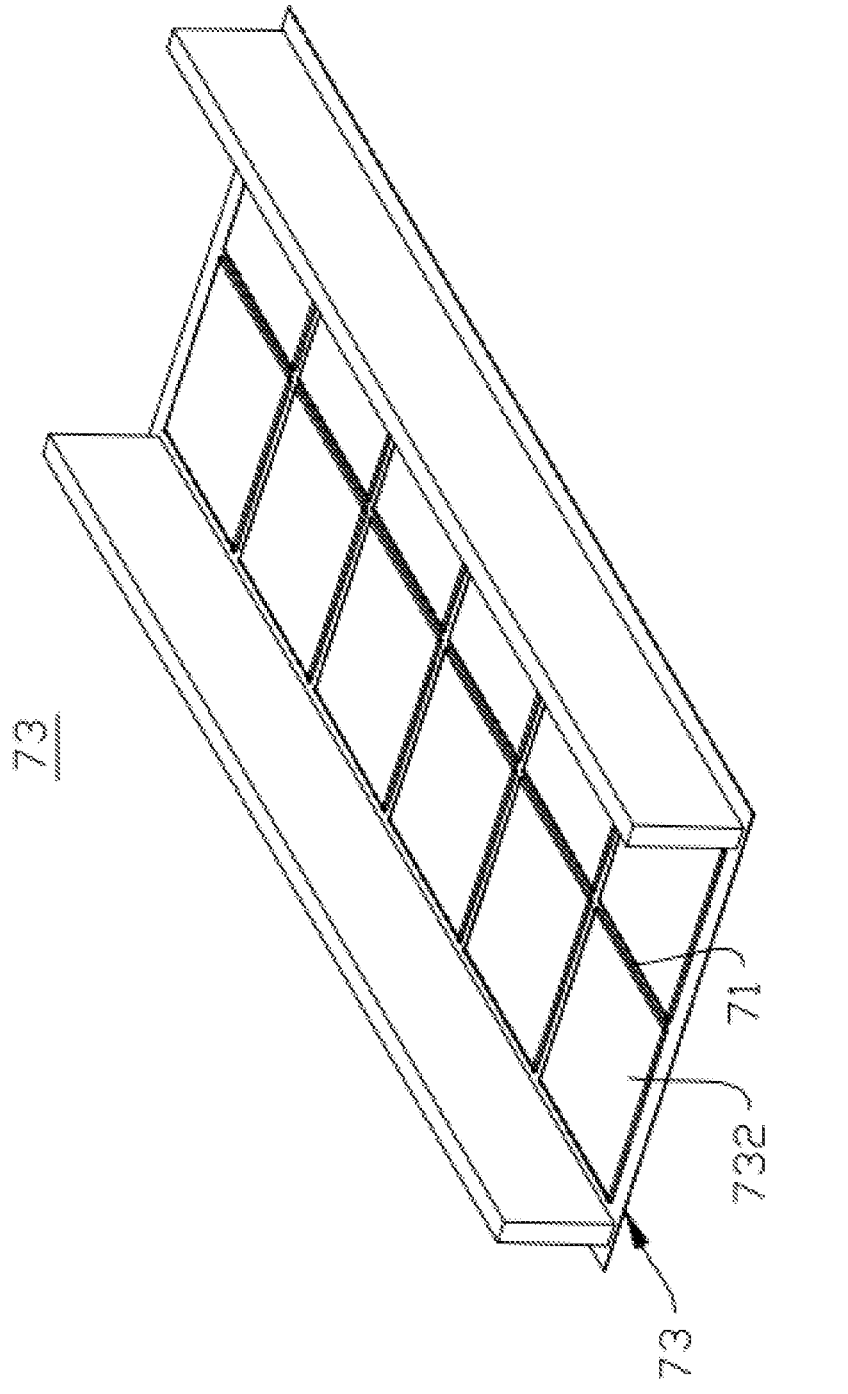
Figure 12:
Figure 12:
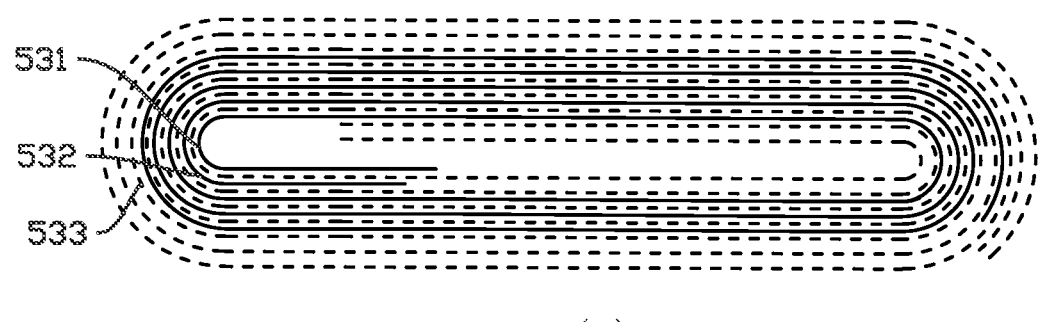
Figure 12:
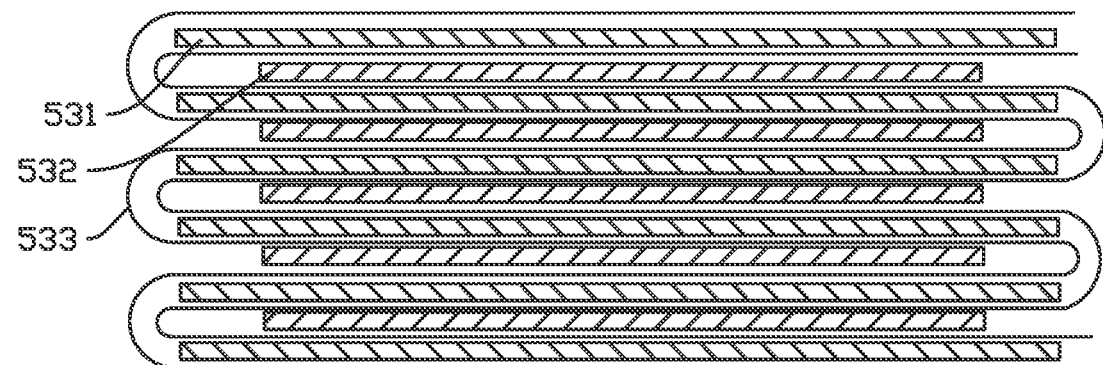
Figure 12:
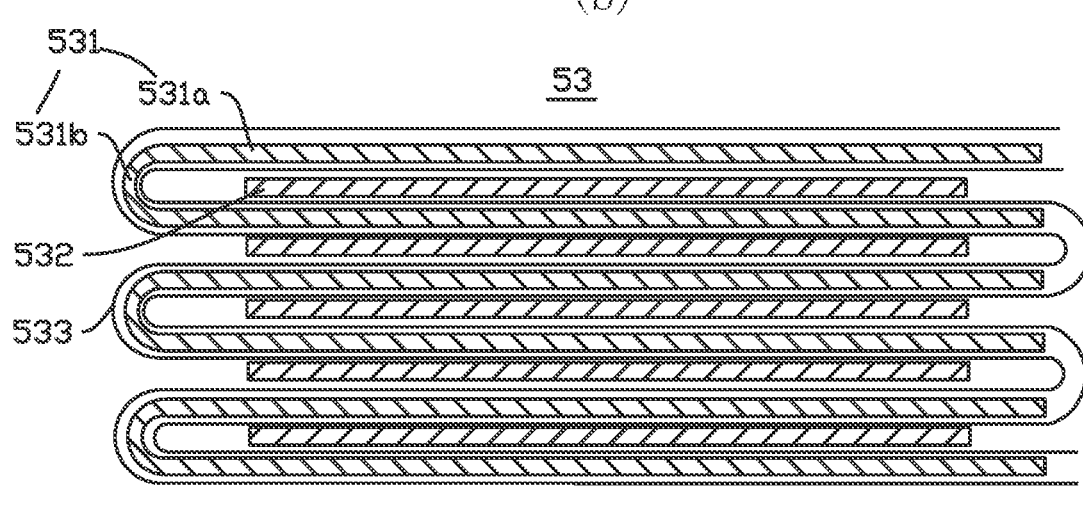
Figure 13:
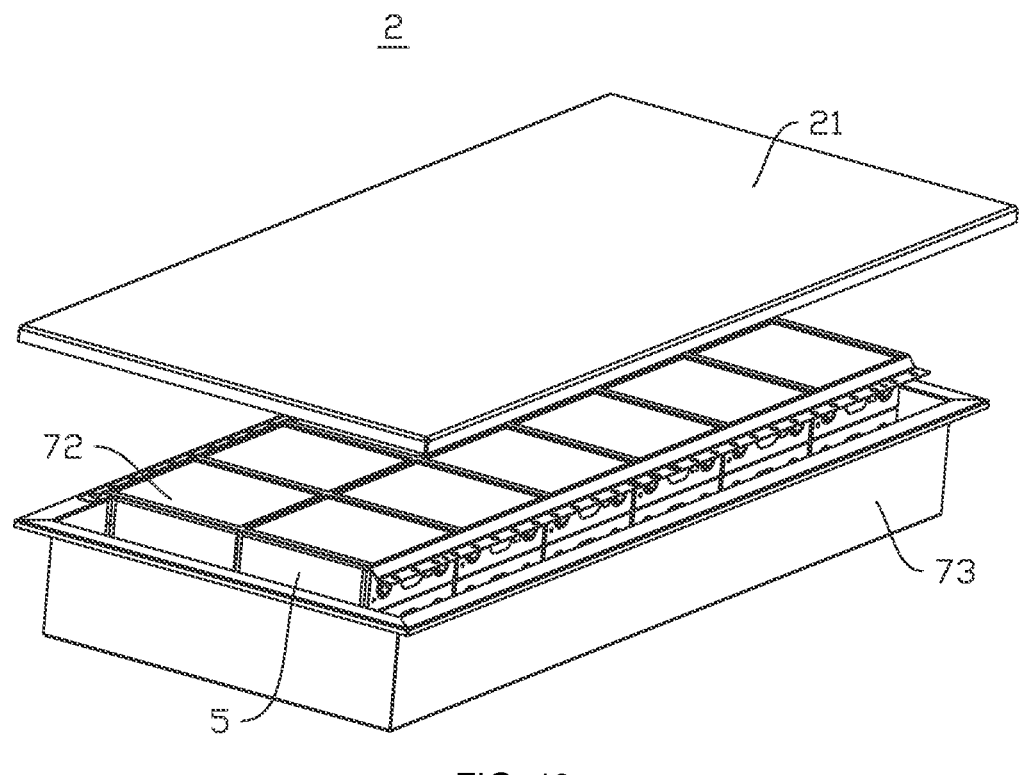
Figure 14:
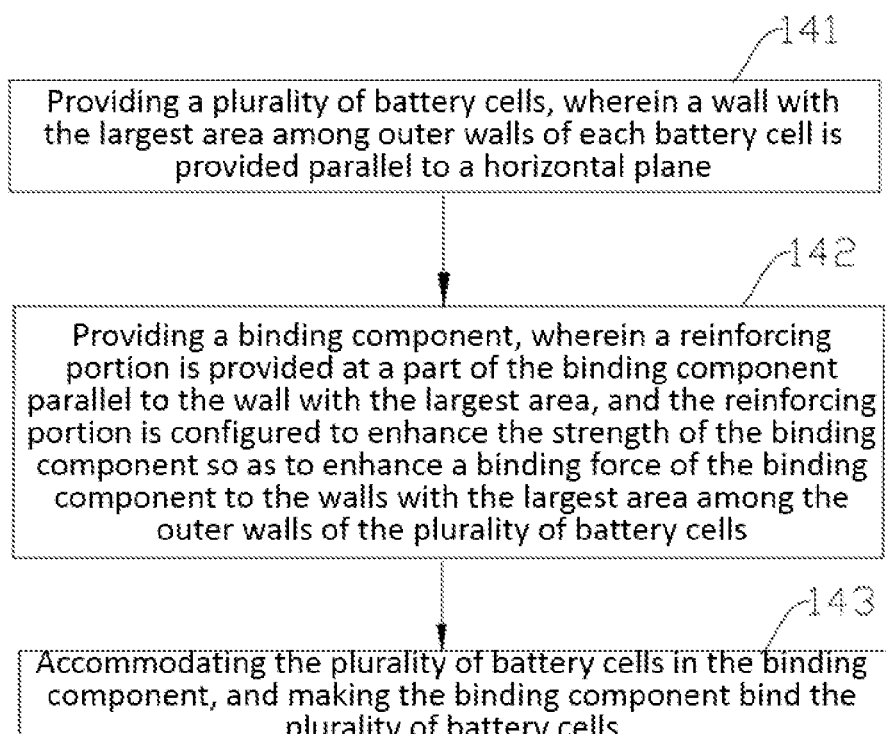
Figure 15:
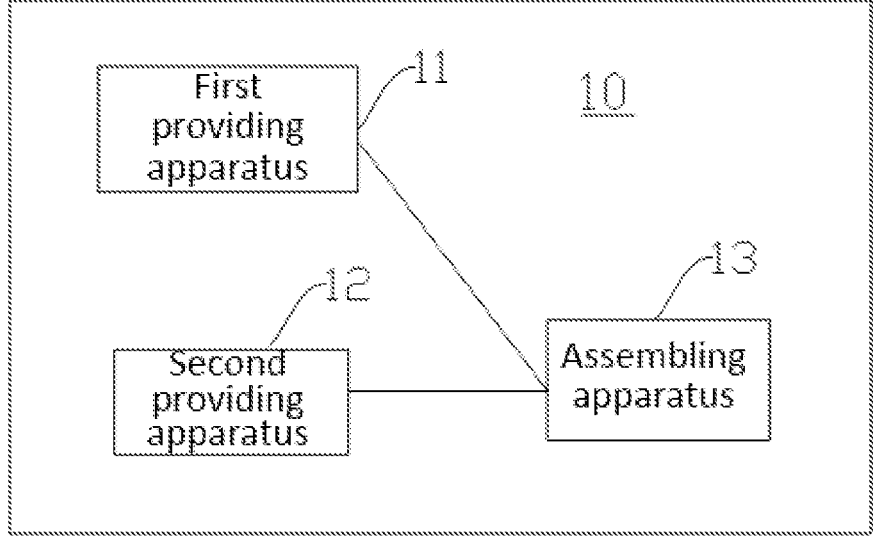

(a) in FIG. 7 is a sectional view of FIG. 5 in an A-A direction;

(b) in FIG. 7 is a sectional view of FIG. 5 in a B-B direction;

FIG. 8 is a partial schematic view of (a) in FIG. 7;

FIG. 9 is a structural schematic view of the battery provided in some embodiments of the present disclosure;

FIG. 10 is a structural schematic view of an upper cover in the battery provided in some embodiments of the present disclosure;

FIG. 11 is a structural schematic view of a lower case in the battery provided in some embodiments of the present disclosure;

FIG. 12 is a sectional schematic view of an electrode assembly of the battery cell in the battery provided in some embodiments of the present disclosure;

FIG. 13 is an exploded structural view of the battery provided in some embodiments of the present disclosure;

FIG. 14 is a flowchart of a method for manufacturing a battery provided in some embodiments of the present disclosure; and FIG. 15 is a structural schematic view of a device for manufacturing a battery provided in some embodiments of the present disclosure.

In the accompanying drawings, the drawings are not necessarily drawn to scale.

REFERENCE SIGNS

1—vehicle, 2—battery, 3—controller, 4—motor, 5—battery cell, 7—binding component, 8—adhesive;

21—upper case, 22—fixed beam;

51—end cover, 52—housing, 521—first side wall, 521*a*—first wall, 522—second side wall, 523—bottom wall; 53—electrode assembly, 531—first electrode sheet, 531*a*—stacked segment, 531*b*—bent segment, 532—second electrode sheet, 533—separator;

71—reinforcing portion, 71*a*—first reinforcing portion, 72—upper cover, 721—upper cover body, 722—fixing portion, 73—lower case, 731—side plate, 732—bottom plate, 74—recess;

L—horizontal distance between an edge of the first reinforcing portion and the first wall;

$R_1$—region between two adjacent battery cells, $R_2$—region between the battery cell and the binding component.

DETAILED DESCRIPTION OF EMBODIMENTS

In order to make objectives, technical solutions, and advantages of the embodiments of the present disclosure clearer, the technical solutions in the embodiments of the present disclosure will be described clearly below in conjunction with accompanying drawings in the embodiments of the present disclosure, and apparently, the embodiments described are some but not all embodiments of the present disclosure. All the other embodiments obtained by those ordinarily skilled in the art based on the embodiments of the present disclosure without any creative effort shall fall within the scope of protection of the present disclosure.

In order to make objectives, technical solutions, and advantages of the embodiments of the present disclosure clearer, the technical solutions in the embodiments of the present disclosure will be described clearly and completely below in conjunction with accompanying drawings in the embodiments of the present disclosure, and apparently, the embodiments described are some but not all embodiments of the present disclosure. All of other embodiments obtained by those ordinarily skilled in the art based on the embodiments in the present disclosure without using any creative effort shall fall within the scope of protection of the present disclosure.

It should be noted that, unless otherwise indicated, the technical terms or scientific terms used in the embodiments of the present disclosure should have the usual meanings understood by those skilled in the art to which the embodiments of the present disclosure belong.

In the description of the embodiments of the present disclosure, orientation or positional relations indicated by terms "center", "longitudinal", "lateral", "length", "width", "thickness", "upper", "lower", "front", "back", "left", "right", "vertical", "horizontal", "top", "bottom", "inner", "outer", "clockwise", "anticlockwise", "axial", "radial", and "circumferential" and so on are based on orientation or positional relations as shown in the accompanying drawings, merely for facilitating the description of the embodiments of the present disclosure and simplifying the description, rather than indicating or implying that related devices or elements have to be in the specific orientation or configured and operated in a specific orientation, therefore, they should not be construed as limitation on the embodiments of the present disclosure.

Besides, the technical terms such as "first" and "second" are merely for descriptive purpose, but should not be construed as indicating or implying importance in the relativity or suggesting the number of a related technical feature, or describing a specific order or primary-secondary relationship.

In the text, the term "and/or" is merely an association relationship describing associated objects, and indicates that there may be three relationships. For example, "A and/or B" may indicate three situations, namely, A exists alone, both A and B exist, and B exists alone. In addition, the character "I" in the text generally indicates that the associated objects before and after the character are in an "or" relation.

In the present disclosure, "a plurality of" means two or more (including two), similarly, "a plurality of groups" means two or more groups (including two groups).

In the description of the present disclosure, unless otherwise specified and defined explicitly, technical terms such as "mount", "join", "connect", and "fix" should be construed in a broad sense, for example, a connection may be a fixed connection, a detachable connection, or an integral connection; it may be a mechanical connection, or an electrical connection; it may be a direct connection, an indirect connection via an intermediary, or internal communication between two elements or interaction between two elements. For those ordinarily skilled in the art, specific meanings of the above-mentioned terms in the embodiments of the present disclosure can be understood according to specific circumstances.

The phrase "embodiments" referred to in the text means that the specific features, structures, and characteristics described in combination with the embodiments may be included in at least one embodiment of the present disclosure. The phrase appearing at various locations in the specification does not necessarily refer to the same embodiment, or an independent or alternative embodiment exclusive of another embodiment. Those skilled in the art could understand that an embodiment described in the present disclosure may be combined with another embodiment.

The batteries referred to in the art may be classified into primary batteries and rechargeable batteries according to whether they are rechargeable or not. The primary battery is commonly referred to as "disposable" battery and galvanic battery because it is not rechargeable after running out of power and can only be discarded. The rechargeable battery is also called as a secondary battery or accumulator. The rechargeable battery is made of different materials and different processes from those of the disposable battery, and has the advantages that the rechargeable battery can be repeatedly used after being charged, and an output current load capacity of the rechargeable battery is higher than that of most disposable batteries. The types of rechargeable batteries that are common today are: lead-acid battery, nickel-metal hydride battery, and lithium-ion battery. The lithium-ion battery has the advantages of light weight, large capacity (the capacity is 1.5-2 times of that of the nickel-metal hydride battery with the same weight), no memory effect and the like, and has a very low self-discharge rate, so that although the price is relatively high, the lithium-ion battery is still widely applied. The battery described in the embodiments of the present disclosure refers to the rechargeable lithium-ion battery.

The battery mentioned in the embodiments of the present disclosure refers to a single physical module that includes one or more battery cells (also possibly called as battery core) to provide a higher voltage and capacity. For example, the battery mentioned in the present disclosure may include a battery module or a battery pack, etc. The battery cells may include lithium-ion secondary battery cells, lithium-ion primary battery cells, lithium-sulfur battery cells, sodium/lithium-ion battery cells, sodium-ion battery cells or magnesium-ion battery cells, etc. The battery cells may be flat, cuboid or in other shapes. The battery cells generally include hard shell battery cells and pouch battery cells.

The battery cell includes a positive electrode sheet, a negative electrode sheet, an electrolytic solution, and a separator, and is a basic structural unit for forming a battery module and a battery pack. Common positive electrode materials (also referred to as positive electrode active materials) for lithium-ion batteries include lithium cobaltate, lithium manganate, lithium nickelate, lithium iron phosphate, ternary materials (e.g., lithium nickel cobalt manganate) and the like, common negative electrode materials (also referred to as negative electrode active materials) include carbon materials (e.g., graphite) and silicon-based materials and the like, and common separator materials include polyolefin materials mainly composed of polyethylene (PE) or polypropylene (PP). The battery cells are generally divided into three types according to the way of packaging: cylindrical battery cells, top battery cells, and pouch battery cells.

A plurality of battery cells may be connected in series and/or in parallel via electrode terminals to be applied to various applications. In some high power applications, such as electric vehicles, the application of batteries includes three levels: battery cell, battery module, and battery pack. The battery module is formed by electrically coupling a certain number of battery cells together and putting them in a frame in order to protect the battery cells against external impact, heat, vibration, etc. The battery pack is a final state of a battery system installed in a vehicle. Most battery packs today are manufactured by assembling various control and protection systems, such as a battery management system (BMS) and a thermal management unit on one or more battery modules. With the development of the technology, this level of the battery module can be omitted, that is, the battery pack is directly formed of the battery cells. This improvement makes the number of parts to be remarkably reduced while improving the weight energy density and the volume energy density of the battery system. The battery mentioned in the present disclosure includes a battery module or a battery pack.

The battery generally includes a case and a plurality of battery cells accommodated in the case. The case may include an upper case and a lower case, the upper case and the lower case cover each other, and the upper case and the lower case jointly define an accommodating space for accommodating a plurality of battery cells. Based on the normal placement of the battery, the upper case generally at least includes a top plate substantially parallel to a horizontal plane, and the lower case generally is of a hollow structure with an open end, and at least includes a bottom plate substantially parallel to the horizontal plane and side plates surrounding and connected to the periphery of the bottom plate.

For the prismatic battery cell, it typically includes an end cover and a housing, the housing being substantially square in shape, and including a bottom wall of the housing opposite to the end cover and side walls of the housing provided between the end cover and the bottom wall of the housing. The side walls of the housing generally include two first side walls provided opposite to each other and two second side walls provided opposite to each other and connected between the two first side walls, and each first side wall has a larger area than each second side wall. Each first side wall also has a larger area than the end cover and the bottom wall, and the first side wall is the wall with the largest area among outer walls of the battery cell.

Figure 1:
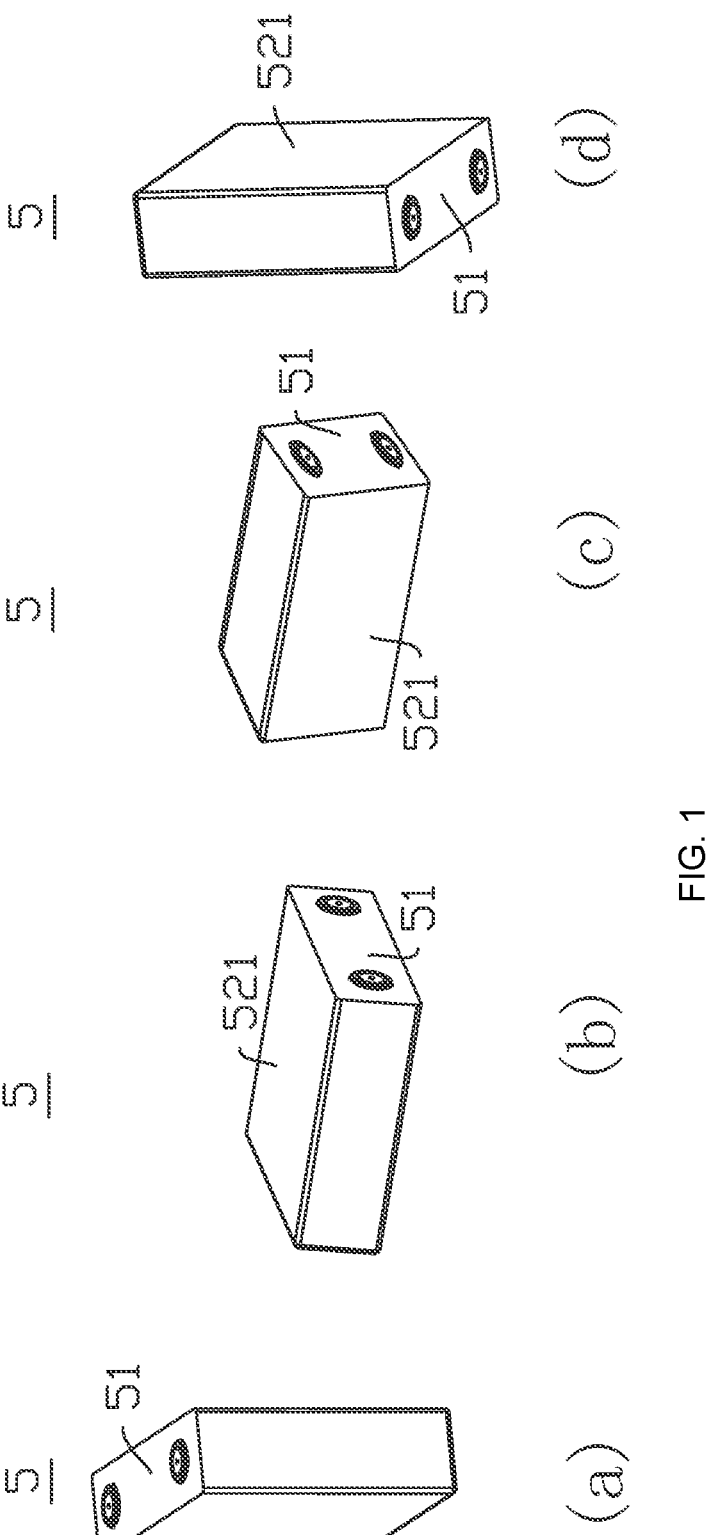
FIG. 1 shows schematic views of different placement modes of a battery cell in a case.

The placement modes of the battery cell in the case include upright placement, horizontal placement (i.e. flat placement), sideways placement, and inverted placement. FIG. 1 shows schematic views of different placement modes of a battery cell in a case. As shown in (a) in FIG. 1, "upright placement" of a battery cell 5 in the case means that the battery cell 5 is installed in the case in a manner that an end cover 51 is adjacent to and approximately parallel to the top plate. As shown in (b) in FIG. 1, "horizontal placement" of the battery cell 5 in the case means that the battery cell 5 is installed in the case in a manner that the end cover 51 is approximately perpendicular to the top plate, and a wall (i.e. first side wall 521) with the largest area among the side walls of the battery cell 5 is parallel to the top plate (i.e. parallel to the horizontal plane). As shown in (c) in FIG. 1, "sideways placement" of the battery cell 5 in the case means that the battery cell 5 is installed in the case in a manner that the end cover 51 is approximately perpendicular to the top plate, and is different from the "horizontal placement" in that the wall (i.e. first side wall 521) with the largest area among the side walls of the battery cell 5 is perpendicular to the top plate in the "sideways placement". As shown in (d) in FIG. 1, "inverted placement" of the battery cell 5 in the case means that the battery cell 5 is installed in the case in a manner that the end cover 51 is adjacent to and approximately parallel to the bottom plate.

The process of using the battery is just a process of multiple charge and discharge cycles of the battery cell. In the process of charge and discharge cycle of the battery cell, positive and negative electrode sheets in an electrode assembly of the battery cell may cause periodic expansion of the battery cell due to structural change of an active material or occurrence of side reaction. As the battery life cycle is prolonged, an expansion force generated during the periodic expansion tends to increase gradually. Too much expansion and deformation of the battery cell may cause failure of the battery due to too large stress, and the performance of the battery cell in the cycle process is affected.

In order to be capable of resisting the increase of the expansion force, an upper cover is generally provided between the battery cell and the upper case, and the upper cover is installed and fixed to the lower case. After being installed in position, the upper cover binds the top of the battery cell, so that the battery cell will not be deformed too much in a vertical direction, thus avoiding too much expansion and deformation of the battery cell from affecting the performance of the battery cell in the cycle process. Meanwhile, the upper cover cannot exert too large pressure on the battery cell, otherwise, the battery cell is prone to lithium precipitation in the process of charge and discharge cycle to reduce the cycle life time of the battery cell. In order to ensure the energy density of the battery, a relatively thin upper cover is generally provided.

When the battery cell is placed upright, sideways, or inverted in the case, the walls adjacent to and parallel to the upper cover and the bottom plate of the lower case are the end cover, the bottom wall and/or the second side walls of the housing. Compared with the first side walls, the end cover, the bottom wall and/or the second side walls of the housing have a smaller area, in this case, the relatively thin upper cover structure can meet the requirement of binding the end cover, the bottom wall and/or the second side walls of the housing. With regard to the first side walls with a relatively large area, an end plate is generally provided at a side edge thereof, and the end plate is tightly locked to the lower case, to provide a relatively strong binding force for the first side walls, and meet the requirement of binding the first side walls.

When the battery cell is horizontally placed in the case, the walls adjacent to and parallel to the upper cover and the bottom plate of the lower case are the first side walls, and as the first side walls have a relatively large area, the binding force provided by the relatively thin upper cover for the first side walls is insufficient to bind the first side walls, so that the first side walls are likely to expand. When the first side walls expand beyond a certain degree (for example, 16% or more), they will extrude structural parts of the battery such as the upper cover and the case of the battery, and may cause deformation and failure of the whole battery due to too large stress. If the upper cover is thickened as a whole, although the binding force to the first side walls can be improved, the energy density of the battery may be reduced.

Therefore, with regard to the battery with the battery cell being placed horizontally in the case, how to form a relatively strong binding force on the first side walls of the battery cell in the battery without reducing the energy density of the battery as far as possible is a technical problem to be solved.

In view of this, the present disclosure provides a battery, in which battery, battery cells are placed horizontally in a case, that is, walls with the largest area among outer walls of the battery cells in the battery are provided parallel to a horizontal plane. The battery cells in the battery are accommodated and bound with a binding component, a reinforcing portion is provided at a part of the binding component parallel to the walls with the largest area, and the strength of the binding component is reinforced by the reinforcing portion, so as to enhance a binding force of the binding component to the walls with the largest area among outer walls of the plurality of battery cells, avoid too much expansion and deformation of the battery cells, reduce the failure probability of the battery caused by extrusion to other structural parts of the battery after the battery cells expand, and guarantee the performance of the battery during the cycle. Moreover, there is no need to thicken the upper cover as a whole, ensuring the energy density of the battery as far as possible.

The electric device described in the embodiments of the present disclosure may be vehicles, mobile phones, portable apparatuses, notebook computers, ships, spacecrafts, electric toys, electric tools, etc. The vehicles can be a fuel-powered vehicle, a gas-powered vehicle or a new-energy vehicle, and the new-energy vehicle may be a battery electric vehicle, a hybrid vehicle or an extended-range vehicle, etc.; the spacecrafts include airplanes, rockets, space shuttles, spaceships, etc.; the electric toys include stationary or movable electric toys, for example, game machines, electric automobile toys, electric ship toys, electric plane toys, etc.; the electric tools include metal cutting electric tools, grinding electric tools, assembling electric tools, and railway electric tools such as electric drills, electric grinders, electric spanners, electric screwdrivers, electric hammers, electric impact drills, concrete vibrators, electric grooves etc. The embodiments of the present disclosure do not impose special restrictions on the foregoing electric devices.

For convenience of description, the following embodiments are described by taking an example in which the electric device is a vehicle.

Figure 2:
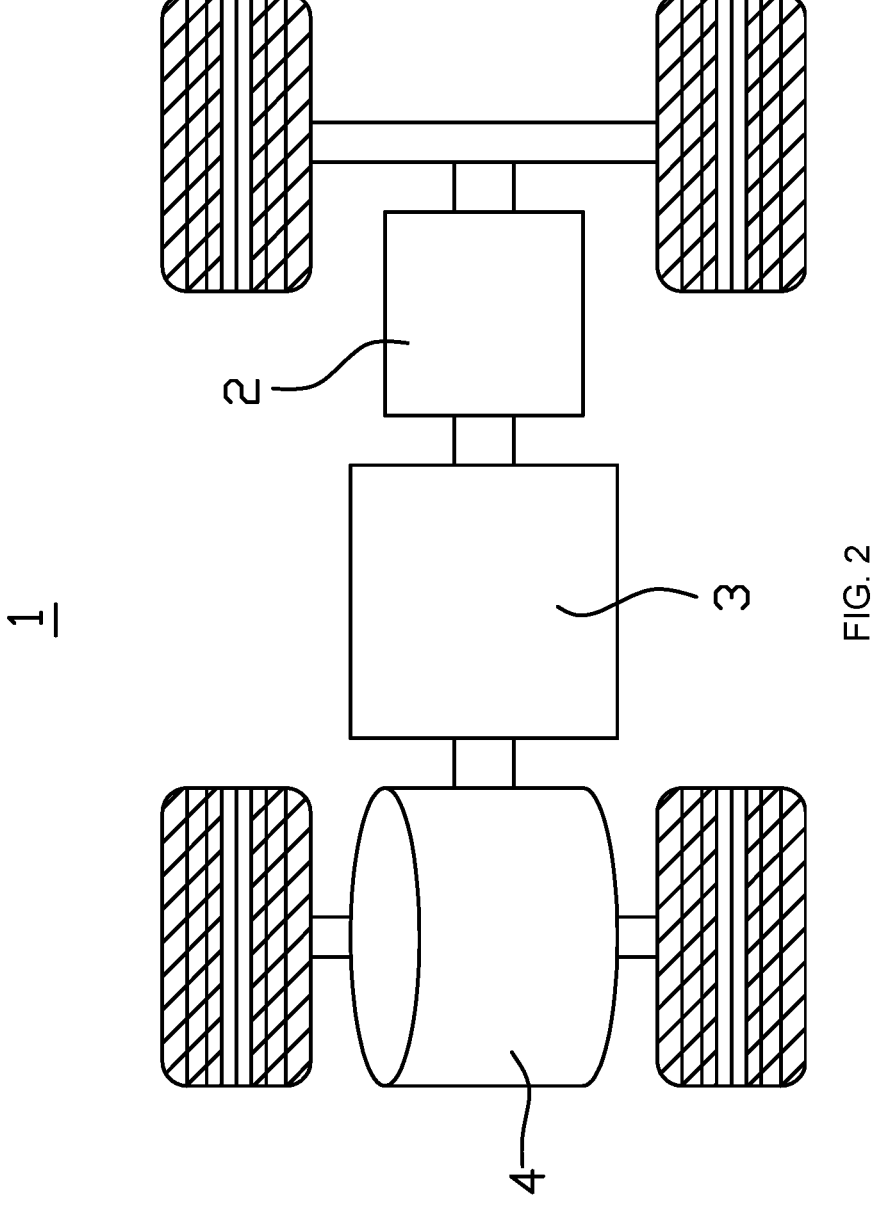
FIG. 2 is a structural schematic view of a vehicle provided in some embodiments of the present disclosure.

Referring to FIG. 2, FIG. 2 is a structural schematic view of a vehicle provided in some embodiments of the present disclosure. As shown in FIG. 2, a battery 2 is provided in a vehicle 1, wherein the battery 2 refers to a single physical module that includes one or more battery cells to provide a higher voltage and capacity, for example, the battery 2 mentioned in the present disclosure may include a battery module or a battery pack etc. The battery 2 may be provided at the bottom or the head or the tail of the vehicle 1. The battery 2 may be used to supply power to the vehicle 1, for example, the battery 2 can be used as an operation power supply of the vehicle 1. The vehicle 1 further may include a controller 3 and a motor 4, wherein the controller 3 is configured to control the battery 2 to supply power to the motor 4, for example, for a working power demand of the vehicle 1 during startup, navigation, and running.

In some embodiments of the present disclosure, the battery 2 may be used not only as an operation power supply for the vehicle 1 but also as a driving power supply for the vehicle 1, replacing or partially replacing fuel or natural gas to provide driving power for the vehicle 1.

The battery 2 of some embodiments of the present disclosure is described in detail below.

Figure 3:
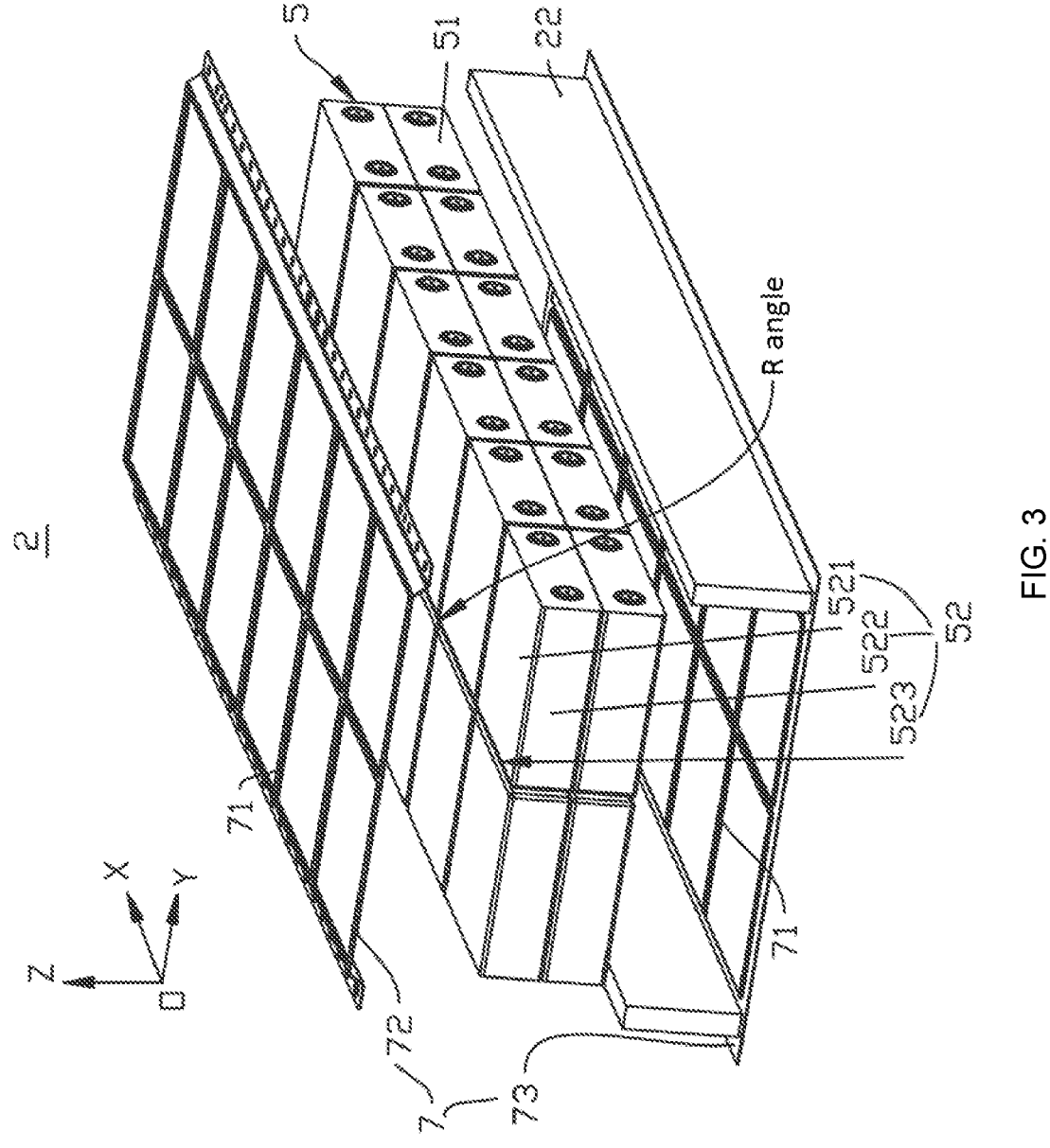
FIG. 3 is an exploded schematic view of a battery provided in some embodiments of the present disclosure.

FIG. 3 is an exploded schematic view of a battery provided in some embodiments of the present disclosure. As shown in FIG. 3, the battery 2 includes a plurality of battery cells 5 and a binding component 7. A wall with the largest area among outer walls of each battery cell 5 is provided parallel to a horizontal plane. The binding component 7 is configured to accommodate and bind the plurality of battery cells 5, and bind the wall with the largest area among the outer walls of the battery cell, a reinforcing portion 71 is provided at a part of the binding component 7 parallel to the wall with the largest area, and the reinforcing portion 71 is configured to reinforce the strength of the binding component 7 so as to enhance a binding force of the binding component 7 to the walls with the largest area among the outer walls of the plurality of batter cells 5.

In the drawing, an OXY plane is a horizontal plane, and a direction of Z-axis is a vertical direction.

In the following description, a group of battery cells 5 arranged in an X-axis direction is referred to as a row of battery cell group, and a group of battery cells 5 arranged in a Y-axis direction is referred to as a column of battery cell group. For example, in FIG. 3, a row of battery cell group includes (6*2) 12 battery cells 5 in total, and a column of battery cell group includes (2*2) 4 battery cells 5 in total.

Each battery cell 5 includes an end cover 51 and a housing 52, and the housing 52 includes a bottom wall 523 opposite to the end cover 51 and side walls of the housing provided between the end cover 51 and the bottom wall 523 of the housing 52. The side walls of the housing include two first side walls 521 provided opposite to each other and two second side walls 522 provided opposite to each other and connected between the two first side walls 521, and each first side wall 521 has a larger area than each second side wall 522, and each first side wall 521 also has a larger area than the end cover 51 and the bottom wall 523 of the housing. In the above, "outer walls" of the battery cell 5 include the end cover 51 and various walls of the housing 52, and "wall with the largest area among outer walls" refers to the first side walls 521. In the above, the first side walls 521 are parallel to the horizontal plane (XOY plane), and the end cover 51 and the other side walls of the housing 52 are all perpendicular to the horizontal plane.

The first side walls 521 being provided parallel to the horizontal plane also includes the case that the first side walls 521 are substantially parallel to the horizontal plane. The arrangement of the battery cells 5 in the embodiments of the present disclosure is the aforementioned "horizontal placement".

Figure 4:
FIG. 4 is a structural schematic view of the battery provided in some embodiments of the present disclosure.

FIG. 4 is a structural schematic view of the battery provided in some embodiments of the present disclosure, and as shown in FIG. 4, the binding component 7 has or is formed with an accommodating space for accommodating the plurality of battery cells 5. The binding of the binding component 7 to the battery cells 5 at least includes binding to the battery cells 5 in the Z-axis direction, and further may include binding to the battery cells 5 in the X-axis and/or Y-axis direction. In the above, the binding force of the binding component 7 to the battery cells 5 in the Z-axis direction includes a downward binding force to the battery cells 5 in a negative direction of the Z-axis and an upward binding force to the battery cells 5 in a positive direction of the Z-axis, and similarly in the X-axis and Y-axis directions.

The binding component 7 shown in the drawings is a hollow structure with openings at two sides. Those skilled in the art should understand that what is shown in the drawings is merely an example, and in other embodiments, the binding component 7 also may be of a closed structure without an opening or a structure with an opening at one side, as long as the binding to the battery cells 5 at least in the Z-axis direction can be generated.

In the embodiments of the present disclosure, the battery cells 5 in the battery 2 are placed horizontally in the case, that is, the walls with the largest area among the outer walls of the battery cells 5 in the battery 2 are provided parallel to the horizontal plane, the battery cells 5 in the battery 2 are accommodated and bound with the binding component, the reinforcing portion 71 is provided at a part of the binding component 7 parallel to the walls with the largest area, and the strength of the binding component 7 is reinforced by the reinforcing portion 71, so as to enhance the binding force of the binding component 7 to the walls with the largest area among outer walls of the plurality of battery cells 5, avoid too much expansion and deformation of the battery cells 5 caused by expansion and deformation of the wall with the largest area among the outer walls of the battery cells 5, reduce the failure probability of the battery 2 caused by extrusion to other structural parts of the battery 2 after the battery cells 5 expand, and guarantee the performance of the battery 2 during the cycle.

In addition, compared with the mode of thickening the whole binding component 7, the mode of providing the reinforcing portion 71 on the binding component 7 can enhance the strength of the binding component 7, and improve the binding force of the binding component 7 to the battery cells 5, without reducing the energy density of the battery 2.

In some embodiments, the reinforcing portion 71 is provided correspondingly to a region between two adjacent battery cells 5 and/or a region between the battery cells 5 and the binding component 7.

Figure 6:
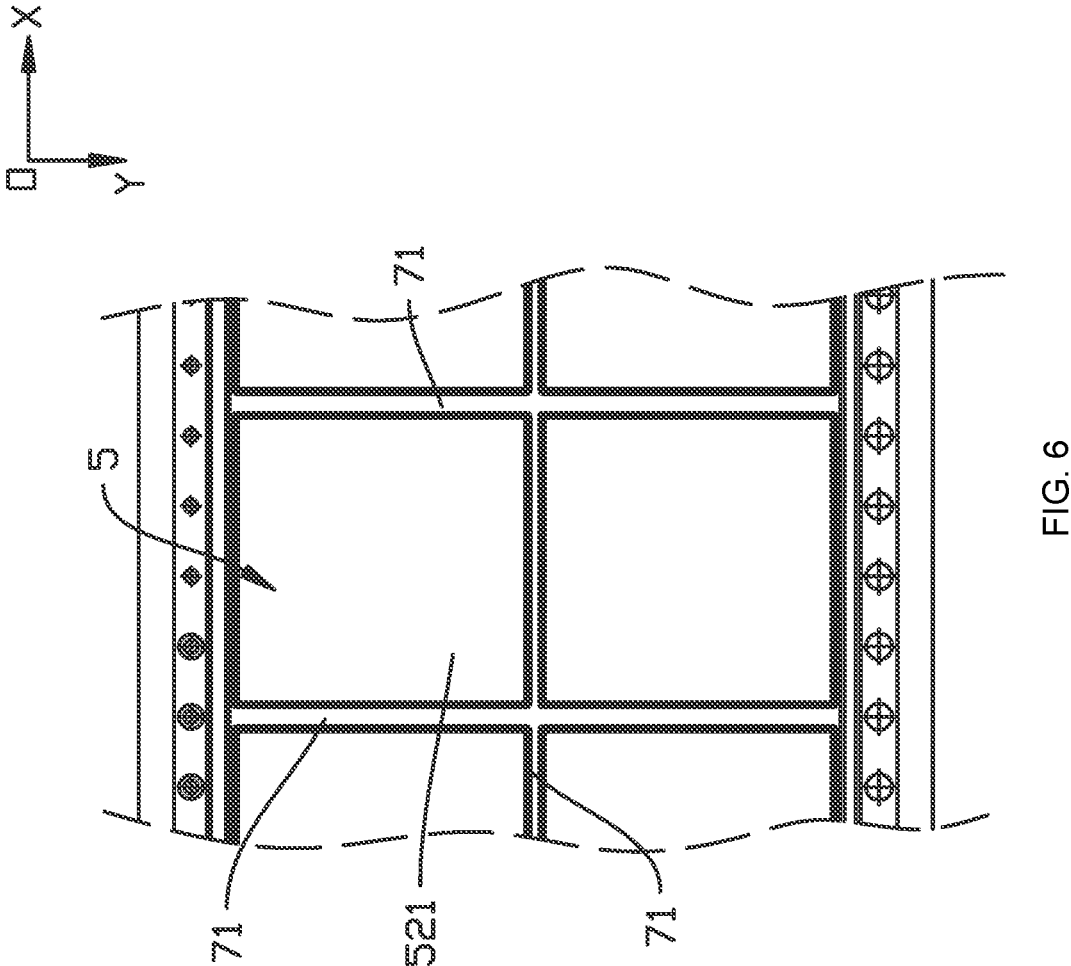
FIG. 6 is a partial schematic view of FIG. 5.

FIG. 5 is a top structural view of the battery provided in some embodiments of the present disclosure, FIG. 6 is a partial schematic view of FIG. 5, (a) in FIG. 7 is a sectional view of FIG. 5 in an A-A direction, (b) in FIG. 7 is a sectional view of FIG. 5 in an B-B direction, and FIG. 8 is a partial schematic view of (a) in FIG. 7. The difference from the embodiments shown in FIG. 3 and FIG. 4 is that the binding component 7 in the battery 2 shown in FIG. 5 to FIG. 8 is of a closed structure without opening.

As shown in FIG. 5 to FIG. 8, two adjacent battery cells 5 are adjacent in the X-axis direction and/or in the Y-axis direction, and the region between two adjacent battery cells 5 includes any one or more of R₁ regions. The battery cells 5 in the "region between the battery cells 5 and the binding component 7 refer to the battery cells 5 adjacent to the binding component 7, and all the battery cells 5 shown in the drawings are adjacent to the binding component 7. Those skilled in the art should understand that what is shown in the drawings is only an example, and in other embodiments, in the case where the binding component 7 shown in FIG. 4 is adopted, when three or more rows of battery cell groups are provided in the X-axis direction, only the battery cells 5 in two outer rows of battery cell groups are the battery cells 5 adjacent to the binding component 7, and middle rows of battery cell groups are not adjacent to the binding component 7. The region between the battery cells 5 and the binding component 7 includes any one or more of R₂ regions shown in FIG. 5.

In the above, "corresponding to" means that, in a section as shown in FIG. 5, a first projection of the reinforcing portion 71 in the Z-axis direction coincides with, substantially coincides with or partially overlap a second projection of the region between two adjacent battery cells 5 and/or the region between the battery cells 5 and the binding component 7 in the Z-axis direction, or the first projection covers the second projection, or the first projection is located within the range of the second projection.

By providing the reinforcing portion 71 corresponding to the region between two adjacent battery cells 5 and/or the region between the battery cells 5 and the binding component 7, compared with the manner of providing the reinforcing portion 71 in other regions, the structural strength of the binding component 7 at the position of the reinforcing portion 71 is enhanced, peripheries of the walls with the largest area among the outer walls of the battery cells 5 can be locked, the binding force to the battery cells 5 can be increased, the amount of expansion and deformation of the battery cells 5 under the same expansion force is reduced, and further the failure of the battery 2 is avoided and the performance of the battery 2 is ensured. Moreover, the above regions are regions with minimum expansion at edges of the battery cells 5, and providing the reinforcing portion 71 at the positions corresponding to the above regions will not occupy an expansion space of the walls with the largest area among the outer walls of the battery cells 5, and will not affect an expansion gap of the battery cells 5, further ensuring the performance of the battery 2.

The reinforcing portion 71 may be correspondingly provided between each two adjacent rows of battery cell groups and between each two adjacent columns of battery cell groups, and the reinforcing portion 71 may be correspondingly provided between each outermost row of battery cell group and the binding component 7 or between each outermost column of battery cell group and the binding component 7, thus increasing the binding force to all the battery cells 5 in the battery 2.

Further, providing the reinforcing portion 71 corresponding to the region between two adjacent battery cells 5 and/or the region between the battery cells 5 and the binding component 7 can reduce the thickness of the housing 52 and/or the end cover 51 of the battery cell 5, for example, using thin-housing battery cells 5, compared with using thick-housing battery cells 5, improves the energy density of the battery 2.

FIG. 9 is a structural schematic view of the battery provided in some embodiments of the present disclosure. As shown in FIG. 9, in some embodiments, the binding component 7 includes an upper cover 72 and a lower case 73. At least a part of the upper cover 72 is provided at the top of the plurality of battery cells 5. At least a part of the lower case 73 is provided at the bottom of the plurality of battery cells 5. The reinforcing portion 71 is provided at the part of the upper cover 72 provided at the top of the plurality of battery cells 5 and/or the part of the lower case 73 provided at the bottom of the plurality of battery cells 5.

As shown in the drawings, the upper cover 72 includes an upper cover body 721 and a fixing portion 722, and "at least a part of the upper cover 72" refers to the upper cover body 721. The lower case 73 includes a bottom plate (not shown) and side plates 731 connected to the bottom plate and surrounding a periphery of the bottom plate. "At least a part of the lower case 73" refers to the bottom plate of the lower case 73.

The top and bottom of the plurality of battery cells 5 respectively refer to the top and bottom of the whole made up of all the battery cells in the Z-axis direction in FIG. 9.

FIG. 10 is a structural schematic view of the upper cover of the battery provided in some embodiments of the present disclosure, and as shown in FIG. 10, the reinforcing portion 71 is provided on the upper cover body 721.

FIG. 11 is a structural schematic view of the lower case in the battery provided in some embodiments of the present disclosure, and as shown in FIG. 11, the reinforcing portion 71 is provided on the bottom plate 732 of the lower case 73.

In the embodiment shown in FIG. 9, the reinforcing portion 71 is provided on both the upper cover 72 and the lower case 73, so as to form the downward binding force to the battery cells 5 in the negative direction of the Z-axis and the upward binding force to the battery cells 5 in the positive direction of the Z-axis, thus better avoiding the expansion and deformation of the battery cells 5. Those skilled in the art should understand that what is shown in the drawing is only an example, and in other embodiments, when the requirement on the binding force to the battery cells 5 is relatively low, it is feasible to provide the reinforcing portion 71 only on the upper cover 72, so as to form the downward binding force to the battery cells 5 in the negative direction of the Z-axis, alternatively, the reinforcing portion 71 is provided only on the lower case 73, so as to form the upward binding force to the battery cells 5 in the positive direction of the Z-axis, thus reducing the cost and improving the production efficiency.

In the above embodiments, by providing the binding component 7 as the upper cover 72 and the lower case 73, providing at least a part of the upper cover 72 on the top of the plurality of battery cells 5, providing at least a part of the lower case 73 on the bottom of the plurality of battery cells 5, and providing the reinforcing portion 71 on the part of the upper cover 72 provided on the top of the plurality of battery cells 5, and/or the part of the lower case 73 provided on the bottom of the plurality of battery cells 5, it is easy to assemble the binding component 7, and the reinforcing portion 71 can be flexibly provided according to actual requirements.

In some embodiments, the reinforcing portion 71 is integrally molded with the binding component 7.

In the above, the reinforcing portion 71 is a component that can strengthen the strength of the binding component 7, and it is integrally molded with the binding component 7, for example, the reinforcing portion 71 and the binding component 7 may be integrally molded through a sheet metal stamping process. Without doubt, the reinforcing portion 71 also may be a component additionally attached to the binding component 7, for example, the reinforcing portion 71 is welded to the binding component 7 by means of welding.

When the reinforcing portion 71 and the binding component 7 are integrally molded, the degree of bonding therebetween can be improved, and the reinforcing effect of the reinforcing portion 71 on the strength of the binding component 7 is enhanced.

With continued reference to FIG. 7, FIG. 8, and FIG. 10, in some embodiments, the binding component 7 protrudes in a direction away from the battery cells 5 to form the reinforcing portion 71, and a recess 74 is formed on a surface of the binding component 7 close to the battery cells 5 in a region opposite to the reinforcing portion 71. The same applies to the lower case 73 shown in FIG. 11.

Herein, "opposite" in the "region opposite to the reinforcing portion 71" means that, in a section shown in FIG. 7, a third projection of the reinforcing portion 71 in the Z-axis direction coincides or substantially coincides with a fourth projection of the recess 74 in the Z-axis direction.

In the present embodiment, the reinforcing portion 71 and the binding component 7 are integrally molded, and the reinforcing portion 71 is formed by making the binding component 7 protrude in a direction away from the battery cells 5, thus facilitating the processing and having a relatively low cost.

A structure of the reinforcing portion 71 formed by making the binding component 7 protrude in the direction away from the battery cells 5 may be a rib.

With continued reference to FIG. 7 and FIG. 8, in some embodiments, the upper cover 72 and the lower case 73 are both provided with the reinforcing portion 71, and the reinforcing portion 71 on the upper cover 72 and the reinforcing portion 71 on the lower case 73 are corresponding in position in a vertical direction. A region between the reinforcing portion 71 on the upper cover 72 and the reinforcing portion 71 on the lower case 73 is filled with an adhesive 8, so as to connect the reinforcing portion 71 on the upper cover 72 and the reinforcing portion 71 on the lower case 73.

By providing the positions of the reinforcing portion 71 on the upper cover 72 and the reinforcing portion 71 on the lower case 73 to be corresponding in the vertical direction, and filling the adhesive 8 in the region between the reinforcing portion 71 on the upper cover 72 and the reinforcing portion 71 on the lower case 73, the reinforcing portion 71 on the upper cover 72 and the reinforcing portion 71 on the lower case 73 are connected by the adhesive 8, thus further improving the strength of the whole binding component 7.

With continued reference to FIG. 3 and FIG. 8, in some embodiments, each battery cell 5 includes the end cover 51 and the housing 52, the end cover 51 is placed perpendicular to the horizontal plane, an R angle is provided at a bottom of the housing 52 away from the end cover 51, and the R angle is covered with the adhesive 8.

The bottom of the housing 52 away from the end cover 51 refers to joint between the side walls and the bottom wall 523 of the housing 52, for example, joint between the first side walls 521 and the bottom wall 523, and/or joint between the second side walls 522 and the bottom wall 523. That is, the R angle is provided at the joint between the side walls and the bottom wall 523 of the housing 52.

Covering the R angle with the adhesive 8 means that, in the sections shown in FIG. 7 and FIG. 8, a fifth projection of the adhesive 8 in the Z-axis direction covers a sixth projection of the R angle in the Z-axis direction, that is, the sixth projection is within the range of the fifth projection.

By covering the R angle with the adhesive 8, the adhesive 8 between two adjacent columns of battery cell groups or between two adjacent rows of battery cell groups forms a glue nail structure, further enhancing the structural strength of the binding component 7 and enhancing the binding strength of the binding component 7 to the battery cells 5.

In some embodiments, as shown in (a) in FIG. 7, in the reinforcing portion 71, we provide a first reinforcing portion 71a, wherein the first reinforcing portion 71a refers to the reinforcing portion 71 covering the region $R_1$ between two adjacent battery cells 5 in the vertical direction.

The term "cover (covering)" in the above means that a seventh projection of the first reinforcing portion 71a in the Z-axis direction covers an eighth projection of the region $R_1$ between two adjacent battery cells 5 in the Z-axis direction, i.e., the eighth projection is within the range of the seventh projection.

As the first reinforcing portion 71a covers the region $R_1$ between two adjacent battery cells 5 in the vertical direction, and this region is a position bonding the battery cells 5 and the upper cover 72 and the lower case 73, by providing the first reinforcing portion 71a at this position and covering the region $R_1$ between two adjacent battery cells 5, degumming can be reduced, and the overall structural strength of the battery 2 can be improved.

In some embodiments, as shown in FIG. 3 and FIG. 8, each battery cell 5 includes the end cover 51 and the housing 52, the end cover 51 is placed perpendicular to the horizontal plane, the R angle is provided at the bottom of the housing 52 away from the end cover 51, and the first reinforcing portion 71a covers adjacent R angles of two adjacent battery cells 5 in the vertical direction.

In the above, the term "cover (covering)" means that the seventh projection of the first reinforcing portion 71a in the Z-axis direction covers the sixth projection of adjacent R angles of two adjacent battery cells 5 in the Z-axis direction, i.e., the sixth projection is within the range of the seventh projection.

As the first reinforcing portion 71a covers the adjacent R angles of two adjacent battery cells 5 in the vertical direction, and this region is a position bonding the battery cells 5 and the upper cover 72 and the lower case 73, by providing the first reinforcing portion 71a at this position, degumming can be reduced, and the overall structural strength of the battery 2 can be improved.

As shown by an enlarged part C in FIG. 8, in some embodiments, the housing 52 includes a first wall 521a, and the first wall 521a is perpendicular to the horizontal plane. A horizontal distance L between an edge of the first reinforcing portion 71a and the first wall 521a is less than or equal to 5 mm.

In the above, the first wall 521a refers to a wall among the side walls of the housing 52 adjacent to another battery cell 5, that is, a wall of the second side walls 522 above.

The horizontal distance between the edge of the first reinforcing portion 71a and the first wall 521a may be 5 mm, 4 mm, 3 mm, 2 mm, 1 mm or any other values less than or equal to 5 mm.

The horizontal distance L between the edge of the first reinforcing portion 71a and the first wall 521a is less than or equal to 5 mm, so that the first reinforcing portion 71a possibly does not cover the first side walls 521 of the battery cell 5 too much, thus ensuring an expansion space for the first side walls 521 of the battery cell 5 that are most likely to expand, and further ensuring the performance of the battery 2.

Each battery cell 5 generally includes an electrode assembly 53, and a structure of the electrode assembly 53 in the battery cell 5 is described below.

In the battery 2 of the embodiments of the present disclosure, an outer shape of each battery cell 5 is square or approximately square, and the electrode assembly 53 therein may include several following structures:

FIG. 12 shows sectional schematic views of the electrode assembly of the battery cell in the battery provided in some embodiments of the present disclosure.

In some embodiments, as shown in (a) in FIG. 12, the electrode assembly 53 includes a first electrode sheet 531 and a second electrode sheet 532. The first electrode sheet 531 and the second electrode sheet 532 are wound around a winding axis and form a winding structure, and the winding axis is parallel to the horizontal plane.

In some embodiments, as shown in (b) in FIG. 12, the electrode assembly 53 includes a plurality of first electrode sheets 531 and a plurality of second electrode sheets 532, and the plurality of first electrode sheets 531 and the plurality of second electrode sheets 532 are alternately stacked in the vertical direction.

In some embodiments, as shown in (c) in FIG. 12, the electrode assembly 53 includes a plurality of second electrode sheets 532, the first electrode sheet 531 includes a plurality of stacked segments 531a that are provided in a stacked manner and a plurality of bent segments 531b, each bent segment 531b is connected to two adjacent stacked segments 531a, and the plurality of stacked segments 531a and the plurality of second electrode sheets 532 are alternately stacked in the vertical direction.

Further, FIG. 12 shows a separator 533 located between the first electrode sheet 531 and the second electrode sheet 532.

The battery cell 5 including the electrode assembly 53 of the above structure substantially has a square outer shape, and has a substantially square housing 52 in the above embodiments, and the side walls of the housing 52 include the first side walls 521 with a larger area and the second side walls 522 with a smaller area. Therefore, for the battery cells 5 obtained in the above manner, a main expansion direction of the battery cells 5 is the vertical direction.

It could be understood that, when the electrode assembly 53 of the above structure is "placed horizontally", the first electrode sheet 531 and the second electrode sheet 532 are both placed horizontally, that is, parallel to the horizontal plane.

The width of each reinforcing portion 71 can be adjusted according to the thickness of the adhesive between the battery cells 5 and the R angle dimension of the battery cells 5, and generally the width is in a range of 2-20 mm, wherein the width refers to the dimension of the reinforcing portion 71 in the X-axis direction shown in (a) in FIG. 7. The depth of each reinforcing portion 71 is in a range of 2-6 mm, and a maximum depth value is affected by a gap between the binding component 7 and other structural parts of the battery 2, for example, a gap between the upper cover 72 and the upper case 21, wherein the depth refers to the dimension of the reinforcing portion 71 in the Z-axis direction shown in (a) in FIG. 7.

FIG. 13 is an exploded structural view of the battery provided in some embodiments of the present disclosure, and as shown in FIG. 13, the battery 2 further includes the upper case 21, and the upper case 21 and the lower case 73 are snap-fitted and sealed.

The upper case 21 and the lower case 73, after being snap-fitted and sealed, accommodate the battery cells 5. The upper case 21 may be of various structures. As shown in FIG. 12, the upper case 21 is a hollow structure with an opening at one end, and it can be understood that the upper case 21 further may be of a plate-like structure. The upper case 21 and the lower case 73 may be of various shapes, such as a cylinder and a cuboid.

In order to improve the sealing property after the upper case 21 and the lower case 73 are connected, a sealing member, such as a sealing glue or a sealing ring, further may be provided between the upper case 21 and the lower case 73.

By providing the upper case 21 and snap-fitting and sealing the upper case 21 and the lower case 73, the battery cells 5 can be protected while the battery cells 5 are accommodated.

It could be understood that the upper cover 72 and the upper case 21 are not connected, and a certain gap exists between the upper cover 72 and the upper case 21, so as to reserve an expansion space for the battery cells 5 and the upper cover 72 as a whole, and prevent the upper case 21 from deforming under the effect of the expansion force of the battery cells 5.

In some embodiments, referring to FIG. 3 and FIG. 4, the lower case 73 is further provided with a fixed beam 22, and the upper cover 72 is fixed to the fixed beam 22, so that the plurality of battery cells 5 are bound between the upper cover 72 and the lower case 73.

The fixed beam 22 may be of a prismatic structure, a cylindrical structure, a plate-like structure, and the drawings show a cuboid in the prismatic structure.

A fixing manner between the upper cover 72 and the fixed beam 22 may be threaded connection fixing, snap-fit fixing or welding etc.

By providing the fixed beam 22, the upper cover 72 is fixed to the fixed beam 22, so that the upper cover 72 can be fixed, and the strength of the binding component 7 also can be enhanced, improving the binding force of the binding component 7 to the battery cells 5.

<With Regard to the Battery Cells 5 and the Battery Module>

The plurality of battery cells 5 may be connected in series or in parallel or in a mixed manner, wherein the mixed manner refers to that the connection of the plurality of battery cells 5 includes both series connection and parallel connection. The plurality of battery cells 5 can be directly connected together in series, in parallel or in a mixed manner, and then the whole constituted by the plurality of battery cells 5 is accommodated in the lower case 73; without doubt, it is also feasible that the plurality of battery cells 5 are first connected in series or in parallel or in a mixed manner to form a battery module, and then the plurality of battery modules are connected in series or in parallel or in a mixed manner to form a whole and accommodated in the lower case 73.

In the installation process, after the battery cells 5 are installed in place, the upper cover 72 is fixed to the lower case 73 (or the fixed beam 22), and then the upper case 21 and the lower case 73 are snap-fitted together.

Referring to FIG. 14, FIG. 14 is a flowchart of a method for manufacturing a battery provided in some embodiments of the present disclosure, and the method for manufacturing a battery includes the following contents:

Step 141, providing a plurality of battery cells, wherein a wall with the largest area among outer walls of each battery cell is provided parallel to a horizontal plane;

Step 142, providing a binding component, wherein the binding component is provided with a reinforcing portion, and the reinforcing portion is configured to enhance the strength of the binding component so as to enhance a binding force of the binding component to the plurality of battery cells; and Step 143, accommodating the plurality of battery cells in the binding component, and making the binding component bind the plurality of battery cells.

For a relevant structure of the battery manufactured by the manufacturing method in the present embodiment, reference may be made to relevant contents of the battery described in the embodiments corresponding to FIG. 1 to FIG. 12, and details are not repeatedly described herein.

Referring to FIG. 15, FIG. 15 is a structural schematic view of a device for manufacturing a battery provided in some embodiments of the present disclosure, and the device 10 for manufacturing a battery includes: a first providing apparatus 11, a second providing apparatus 12, and an assembling apparatus 13.

The first providing apparatus 11 is configured to provide a plurality of battery cells, wherein a wall with the largest area among outer walls of each battery cell is provided parallel to a horizontal plane;

the second providing apparatus 12 is configured to provide a binding component, wherein the binding component is provided with a reinforcing portion, and the reinforcing portion is configured to enhance the strength of the binding component so as to enhance a binding force of the binding component to the plurality of battery cells; and the assembling apparatus 13 is configured to accommodate the plurality of battery cells in the binding component, and make the binding component bind the plurality of battery cells.

For a relevant structure of the battery cell manufactured by the manufacturing method in the present embodiment, reference may be made to relevant contents of the battery described in the embodiments corresponding to FIG. 1 to FIG. 12, and details are not repeatedly described herein.

Finally, it should be indicated that the various embodiments above are merely used for illustrating the technical solutions of the present disclosure, rather than limiting the present disclosure. While the detailed description is made to the present disclosure with reference to the various preceding embodiments, those ordinarily skilled in the art should understand that they still could modify the technical solutions recited in various preceding embodiments, or make equivalent substitutions to some or all of the technical features therein. These modifications or substitutions do not make the essence of the corresponding technical solutions depart from the scope of the technical solutions of the various embodiments of the present disclosure, and they should be covered within the scope of the claims and the description of the present disclosure. In particular, various technical features mentioned in various embodiments may be combined in any manner as long as there is no structural conflict. The present disclosure is not restricted to specific embodiments disclosed herein, but covers all technical solutions falling within the scope of the claims.

What is claimed is:

1. A battery, comprising:

a plurality of battery cells, wherein a wall with a largest area among outer walls of each of the battery cells is provided in parallel to a horizontal plane; and a binding component, configured to accommodate and bind the plurality of battery cells, wherein a reinforcing portion is provided at a part of the binding component parallel to the wall with the largest area, and the reinforcing portion is configured to reinforce a strength of the binding component so as to enhance a binding force of the binding component to walls with the largest area among outer walls of the plurality of battery cells, wherein the binding component comprises: an upper cover, wherein at least a part of the upper cover is provided at a top of the plurality of battery cells; and a lower case, wherein at least a part of the lower case is provided at a bottom of the plurality of battery cells, wherein the reinforcing portion is provided at a part of the upper cover provided at the top of the plurality of battery cells, and/or a part of the lower case provided at the bottom of the plurality of battery cells, and wherein the binding component protrudes in a direction away from the battery cells to form the reinforcing portion, and a recess is formed on a surface of the binding component close to the battery cells in a region opposite to the reinforcing portion.

2. The battery according to claim 1, wherein the reinforcing portion is provided correspondingly to a region ($R_1$) between two adjacent battery cells and/or a region ($R_2$) between the battery cells and the binding component.

3. The battery according to claim 1, wherein the reinforcing portion is integrally molded with the binding component.

4. The battery according to claim 1, wherein the upper cover and the lower case are both provided with the reinforcing portion, and the reinforcing portion on the upper cover and the reinforcing portion on the lower case are corresponding in position in a vertical direction; and a region between the reinforcing portion on the upper cover and the reinforcing portion on the lower case is filled with an adhesive, so as to connect the reinforcing portion on the upper cover and the reinforcing portion on the lower case.

5. The battery according to claim 4, wherein each of the battery cells comprises an end cover and a housing, the end cover is placed perpendicular to the horizontal plane, an R angle is provided at a bottom of the housing away from the end cover, and the R angle is covered by the adhesive.

6. The battery according to claim 1, wherein the reinforcing portion comprises a first reinforcing portion, and the first reinforcing portion covers a region between two adjacent battery cells in a vertical direction.

7. The battery according to claim 6, wherein each of the battery cells comprises an end cover and a housing, the end cover is placed perpendicular to the horizontal plane, an R angle is provided at a bottom of the housing away from the end cover, and the first reinforcing portion covers adjacent R angles of two adjacent battery cells in the vertical direction.

8. The battery according to claim 7, wherein the housing comprises a first wall, and the first wall is perpendicular to the horizontal plane; and a horizontal distance (L) between an edge of the first reinforcing portion and the first wall is less than or equal to 5 mm.

9. The battery according to claim 1, wherein each of the battery cells comprises an electrode assembly, and the electrode assembly comprises a first electrode sheet and a second electrode sheet, wherein the first electrode sheet and the second electrode sheet are wound around a winding axis and form a winding structure, and the winding axis is parallel to the horizontal plane; or the electrode assembly comprises a plurality of first electrode sheets and a plurality of second electrode sheets, and the plurality of first electrode sheets and the plurality of second electrode sheets are alternately stacked in a vertical direction; or the electrode assembly comprises a plurality of second electrode sheets, the first electrode sheet comprises a plurality of stacked segments that are provided in a stacked manner and a plurality of bent segments, each of the bent segments is connected to two adjacent stacked segments, and the plurality of stacked segments and the plurality of second electrode sheets are alternately stacked in the vertical direction.

10. The battery according to claim 1, wherein the battery further comprises an upper case, and the upper case and the lower case are snap-fitted and sealed.

11. The battery according to claim 1, wherein the lower case is further provided with a fixed beam, and the upper cover is fixed to the fixed beam, so that the plurality of battery cells are bound between the upper cover and the lower case.

12. An electric device, wherein the electric device comprises the battery according to claim 1, and the battery is configured to provide electrical energy.

13. A method for manufacturing the battery according to claim 1, comprising:

providing the plurality of battery cells;

providing the binding component; and accommodating the plurality of battery cells in the binding component, and making the binding component bind the plurality of battery cells.

\* \* \* \* \*